(12) United States Patent
Hayden et al.

(10) Patent No.: US 7,937,453 B1
(45) Date of Patent: May 3, 2011

(54) SCALABLE GLOBAL NAMESPACE THROUGH REFERRAL REDIRECTION AT THE MAPPING LAYER

(75) Inventors: John M. Hayden, Holliston, MA (US); Xiaoye Jiang, Shrewsbury, MA (US)

(73) Assignee: EMC Corporation, Hopkinton, MA (US)

( * ) Notice: Subject to any disclaimer, the term of this patent is extended or adjusted under 35 U.S.C. 154(b) by 281 days.

(21) Appl. No.: 12/236,997

(22) Filed: Sep. 24, 2008

(51) Int. Cl.
| | |
|---|---|
| G06F 15/16 | (2006.01) |
| G06F 15/173 | (2006.01) |
| G06F 7/00 | (2006.01) |
| G06F 17/30 | (2006.01) |
| G06F 12/00 | (2006.01) |

(52) U.S. Cl. ........ 709/219; 709/229; 709/203; 709/217; 709/223; 707/607; 707/617; 707/625; 707/821; 707/899

(58) Field of Classification Search .................. 707/607, 707/617, 625, 821, 899; 709/229, 219, 203, 709/217, 223
See application file for complete search history.

(56) References Cited

U.S. PATENT DOCUMENTS

| | | | |
|---|---|---|---|
| 5,893,140 A | 4/1999 | Vahalia et al. | |
| 6,324,581 B1 * | 11/2001 | Xu et al. | ...... 709/229 |
| 6,453,354 B1 * | 9/2002 | Jiang et al. | ...... 709/229 |
| 6,691,165 B1 | 2/2004 | Bruck et al. | |
| 6,801,949 B1 | 10/2004 | Bruck et al. | |
| 6,865,157 B1 | 3/2005 | Scott et al. | |
| 6,938,039 B1 | 8/2005 | Bober et al. | |
| 6,968,345 B1 | 11/2005 | Muhlestein | |
| 6,973,455 B1 * | 12/2005 | Vahalia et al. | ...... 1/1 |
| 6,985,914 B2 | 1/2006 | Venkatesh et al. | |
| 7,095,829 B2 | 8/2006 | Claudatos et al. | |
| 7,120,631 B1 * | 10/2006 | Vahalia et al. | ...... 1/1 |
| 7,206,863 B1 | 4/2007 | Oliveira et al. | |
| 7,263,590 B1 | 8/2007 | Todd et al. | |
| 7,272,654 B1 | 9/2007 | Brendel | |
| 7,299,294 B1 | 11/2007 | Bruck et al. | |
| 7,383,463 B2 | 6/2008 | Hayden et al. | |
| 7,437,407 B2 * | 10/2008 | Vahalia et al. | ...... 709/203 |
| 7,475,124 B2 | 1/2009 | Jiang et al. | |
| 7,653,832 B2 * | 1/2010 | Faibish et al. | ...... 714/7 |
| 7,676,514 B2 * | 3/2010 | Faibish et al. | ...... 707/646 |
| 2003/0046357 A1 | 3/2003 | Doyle et al. | |
| 2004/0024786 A1 | 2/2004 | Anderson et al. | |

(Continued)

OTHER PUBLICATIONS

Vahalia, Uresh, Unix Internals: The New Frontiers, 1996, p. 261-289 and 338-371, Prentice-Hall, Inc., Upper Saddle River, NJ.

(Continued)

*Primary Examiner* — Shawki S Ismail
*Assistant Examiner* — Vitali Korobov
(74) *Attorney, Agent, or Firm* — Richard Auchterlonie; Novak Druce & Quigg, LLP

(57) ABSTRACT

Client computers, a namespace server, and file servers are linked in a data network so that the namespace server provides the clients with NFS or CIFS access to a virtual file system including files stored in the file servers, and also provides migration of files between the file servers in a fashion transparent to the client access using NFS or CIFS. The client computers and storage arrays storing the file data are also linked in a storage area network so that the clients have high speed block access to the file data using a file mapping protocol. The namespace server redirects a metadata access request in the file mapping protocol from a client to the appropriate file server when the file is not being migrated, and otherwise denies the metadata access request when the file is being migrated so that the client reverts to NFS or CIFS access.

9 Claims, 17 Drawing Sheets

U.S. PATENT DOCUMENTS

| | | | |
|---|---|---|---|
| 2004/0030822 | A1 | 2/2004 | Rajan et al. |
| 2004/0054748 | A1 | 3/2004 | Ackaouy et al. |
| 2004/0098415 | A1 | 5/2004 | Bone et al. |
| 2004/0128427 | A1 | 7/2004 | Kazar et al. |
| 2004/0139128 | A1 | 7/2004 | Becker et al. |
| 2004/0210583 | A1 | 10/2004 | Enko et al. |
| 2004/0243703 | A1 | 12/2004 | Demmer et al. |
| 2005/0125503 | A1 | 6/2005 | Iyengar et al. |
| 2005/0149528 | A1 | 7/2005 | Anderson et al. |
| 2005/0198401 | A1 | 9/2005 | Chron et al. |
| 2005/0251500 | A1* | 11/2005 | Vahalia et al. ............... 707/1 |
| 2007/0022129 | A1* | 1/2007 | Bahar et al. ............... 707/100 |
| 2007/0055702 | A1 | 3/2007 | Fridella et al. |
| 2007/0055703 | A1 | 3/2007 | Zimran et al. |
| 2007/0088702 | A1 | 4/2007 | Fridella et al. |
| 2007/0174580 | A1* | 7/2007 | Shulga ............... 711/170 |
| 2007/0179990 | A1 | 8/2007 | Zimran et al. |
| 2007/0260842 | A1 | 11/2007 | Faibish et al. |
| 2008/0005468 | A1 | 1/2008 | Faibish et al. |

OTHER PUBLICATIONS

Nowicki, Bill, Networking Working Group, RFC 1094, "NFS: Network File System Protocol Specification," Mar. 1989, 27 pages, Sun Microsystems, Inc., Santa Clara, CA.

Leach, Paul, and Naik, Dilip, "A Common Internet File System," Dec. 19, 1997, 121 pages, Microsoft Corporation, Redmond, WA.

Satran et al., "Internet Small Computer Systems Interface (iSCSI)," Network Working Group, Request for Comments: 3720, Apr. 2004, 240 pages, The Internet Society, Reston, VA.

Shepler et al., "Network File System (NFS) version 4 Protocol," RFC 3530, Network Working Group, Apr. 2003, 275 pages, Sun Microsystems, Inc., Mountain View, CA.

"Referrals, migration and replication for NFSv4, User Guide, version 0.2" bullopensource.org, printed Jul. 28, 2889, 6 pages, Grenoble, France.

"Enginuity: The Symmetrix Storage Operating Environment," EMC White Paper, 2005, 21 pages, EMC Corporation, Hopkinton, MA.

"EMC Symmetrix DMX Architecture," Product Description Guide, 2004, 76 pages, EMC Corporation, Hopkinton, MA.

"Celerra Data Migration Service (CDMS)," White Paper, Jan. 2002, 14 pages, EMC Corporation, Hopkinton, MA.

"EMC Celerra Highroad," EMC Corporation, Hopkinton, MA, Jan. 2002, 10 pages.

Fridella et al., "Elements of a Scalable Network File System Protocol," NEPS Workshop at the University of Michigan, Ann Arbor, MI, Dec. 4, 2003, position paper (5 pages) and presentation ("Building a Scalable NFS," 13 pages), EMC Corporation, Hopkinton, MA.

"Applying EMC OnCourse Technology in a Content Aggregation Scenario," May 6, 2003, 14 pages, EMC Corporation, Hopkinton, MA.

"Information Lifecycle Management: An Automated Approach," Technical White Paper, Dec. 8, 2003, 20 pages, EMC Corporation Hopkinton, MA.

"Automated Resource Management," Technology Brief—Aug. 2002, 3 pages, The Enterprise Storage Group, Milford, MA.

Menon et al., "IBM Storage Tank—a heterogeneous scalable SAN file system," IBM Systems Journal, vol. 42, No. 2, 2003, pp. 250-267, IBM Corp., Armonk, NY.

"File Virtualization with Acopia's Adaptive Resource Switching," 2004, 9 pages, Acopia Networks, Lowell, MA.

Fan et al., NFSv4 Global Namespace Problem Statement, Internet-Draft, Mar. 2005, 10 page, The Internet Society, Reston, VA.

Pereira et al., File System Directory Service Specification, May 2004, 20 pages, Global Grid Forum, Joliet, IL.

"EMC refocuses storage on file migration," CombuterWeekly.com, Jul. 23, 2007, 6 pages, Reed Business Information Ltd, Sutton, Surrey, UK.

Dorling, John, "EMC Rainfinity Global File Virtualization," 31 pages, EMC Forum 2007, 31 pages, EMC Corporation, Hopkinton, MA.

EMC Press Release: New Rainfinity Global File Virtualization Capabilities Simplify NAS Management, Printed Jul. 22, 2008, 2 pages, EMC Corporation, Hopkinton, MA.

"Transparent Data Mobility with EMC Rainfinity Global File Virtualization," Data Sheet, Feb. 2008, 2 pages, EMC Corporation, Hopkinton, MA.

"EMC Rolls Out Rainfinity File Management," Sep. 27, 2006, 2 pages, Enterprise Management Associates, Boulder, CO.

"EMC Rainfinity's Global File Virtualization Appliance," Sep. 30, 2005, 2 pages, Enterprise Management Associates, Boulder, CO.

Fan, Charles, "NFSv4 Namespace & Migration," Sixty-First Internet Engineering Task Force, Nov. 7-12, 2004, Washington, D.C., 9 pages, Corporation for National Research Initiatives, Reston, VA.

Lemahieu, Paul , "EMC Rainfinity Architecture Behind Global File Virtualization," 2007, 51 pages, EMC Corporation, Hopkinton, MA.

Meade, Peter, "Rainfinity Reigns Supreme," Mar. 15, 2005, DSstar, San Diego, CA.

Fan, Charles, "Re: [nfsv4] Migration questions," ietf.org E-mail, Oct. 25, 2004, 5 pages, The Internet Society, Reston, VA.

Fan, Charles, "NFSv4 Global Namespace Requirements," ietf.org Internet-Draft, Oct. 2004, The Internet Society, Reston, VA.

Noveck, Dave, "Referrals in NFS-v4," Connectathon '05, Mar. 2005, 12 pages, San Jose, CA.

Haswell, John, "RE: [nfsv4] Fw: Global namespace and multiple file access protocols," ietf.org E-mail, Dec. 31, 2003, 3 pages, The Internet Society, Reston, VA.

Rinnen, Pushan, "Namespace Virtualization for Logical User Access and Nondisruptive File Migration," Jun. 19, 2007, Gartner Research, Stamford, CT.

"Rainfinity brings stormy days to EMC," Storage magazine, Dec. 2005, 1 page, Needham, MA.

Noveck, Dave, "Some stuff on referrals/migration," E-mail dated May 19, 2004 and attachments "Referrals in NFS-v4.0" and "Migration-related Updates for NFS-v4.1" posted at "playground.sun.com" in NFS Version 4 drafts and mailing list archives, 11 pages, Solaris Software Div. of Sun Microsystems, Inc., Santa Clara, CA.

Noveck, Dave, "Some stuff on referrals/migration," E-mail dated May 21, 2004, 4 pages, nfsv4 E-mail archive posted at ietf.org, The Internet Society, Reston, VA.

Noveck, Dave, "On the v4 referral mechanism," E-mail to Nicholas Williams dated Dec. 30, 2003, 3 pages, nfsv4 E-mail archive posted at ietf.org, The Internet Society, Reston, VA.

Williams, Nicholas, "Global namespace and multiple file access protocols," E-mail dated Jan. 2, 2004 to Jon Haswell, 3 pages fsv4 E-mail archive at ietf.org, The Internet Society, Reston, VA.

Fan, Charles, "Migration Questions," E-mail dated Oct. 25, 2004, 5 pages, nfsv4 E-mail archive at ietf.org, The Internet Society, 5 pages.

Anderson et al., "Interposed Request Routing for Scalable Network Storage," ACM Transactions on Computer Systems, vol. 20, No. 1, Feb. 2002, pp. 1-24, Association for Computing Machinery, New York, NY.

* cited by examiner

| | EXTENT MAP | | |
|---|---|---|---|
| FILE OFFSET | LOGICAL BLOCK ADDRESS | LENGTH | STATUS |
| ---------- | ------------------------- | ---------- | ---------- |
| ---------- | ------------------------- | ---------- | ---------- |
| ---------- | ------------------------- | ---------- | ---------- |
| ---------- | ------------------------- | ---------- | ---------- |

SCALABLE GLOBAL NAMESPACE THROUGH REFERRAL REDIRECTION AT THE MAPPING LAYER

FIELD OF THE INVENTION

The present invention relates to generally to data storage systems, and more particularly to network file servers.

BACKGROUND OF THE INVENTION

In a data network it is conventional for a network file server containing disk storage to service storage access requests from multiple network clients. The storage access requests, for example, are serviced in accordance with a network file access protocol such as the Network File System (NFS) or the Common Internet File System (CIFS) protocol. NFS is described in Bill Nowicki, "NFS: Network File System Protocol Specification," Network Working Group, Request for Comments: 1094, Sun Microsystems, Inc., Mountain View, Calif., March 1989. CIFS is described in Paul L. Leach and Dilip C. Naik, "A Common Internet File System," Microsoft Corporation, Redmond, Wash., Dec. 19, 1997.

A network file server typically includes a digital computer for servicing storage access requests in accordance with at least one network file access protocol, and an array of disk drives. The computer has been called by various names, such as a storage controller, a data mover, or a file server. The computer typically performs client authentication, enforces client access rights to particular storage volumes, directories, or files, and maps directory and file names to allocated logical blocks of storage.

System administrators have been faced with an increasing problem of integrating multiple storage servers of different types into the same data storage network. In the past, it was often possible for the system administrator to avoid this problem by migrating data from a number of small servers into one new large server. The small servers were removed from the network. Then the storage for the data was managed effectively using storage management tools for managing the storage in the one new large server.

Recently, storage vendors have offered global file virtualization capabilities for integrating multiple storage servers of different types into the same data storage network. The global virtualization capabilities provide a mapping between a global virtual namespace exported to network clients and local namespaces of file systems stored in the multiple storage servers of different types. Often the global virtualization capabilities include a facility for migration of files between the multiple storage servers in a way that is transparent to client access to the files. The files can be migrated for load balancing or in response to frequency of access in a storage hierarchy. The global virtualization capabilities, for example, are provided by a namespace server or they are incorporated into a gateway between a between a client-server network and a backend network-attached storage (NAS) network. See, for example, Bruck et al., U.S. Pat. No. 6,691,165 issued Feb. 10, 2004, incorporated herein by reference, and Fridella et al., U.S. Patent Application Pub. 2007/0088702 published Apr. 19, 2007, incorporated herein by reference.

For example, an EMC Corporation "RAINFINITY" (Trademark) file virtualization platform creates a single, logical common namespace for distributed file systems and files. Archived files are replaced with stub files containing metadata identifying the locations of the files even after the files are moved from their original storage locations. To a client, the file appears as if it were still on the primary storage device to which it was first written. Both open and locked files are virtualized and moved in a non-disruptive manner across the virtualized storage environment. This enables non-disruptive capacity management, performance balancing, and data relocation due to technology refreshes and consolidations.

Network clients have used file mapping protocols for high-speed block access to file data. See, for example, Xu et al., U.S. Pat. No. 6,324,581, issued Nov. 27, 2002, incorporated herein by reference. For high-speed block access to the file data, a client fetches file mapping metadata from a file server managing the file in order to determine the logical block addresses of the file data in block storage. Then the client inserts the logical block addresses in Small Computer System Interface (SCSI) read or write commands sent to the storage array containing the file data. In such a case, however, the migration of the file data is not transparent to the client because the migration of the file changes the file mapping metadata.

SUMMARY OF THE INVENTION

It is desired to provide a way of coordinating a namespace server with a file mapping protocol in such a way as to provide virtually all of the benefits of a scalable global namespace, non-disruptive file migration, and high-speed client access to file data in block storage.

In accordance with a first aspect, the invention provides a method of read or write access in a data processing system. The data processing system includes client computers, file servers managing respective file systems, storage arrays storing file data of the file systems, and a namespace server providing the client computers with file access to a virtual file system in accordance with the Network File System (NFS) protocol or the Common Internet File System (CIFS) protocol. The virtual file system contains files of the respective file systems managed by the file servers. The method provides at least one of the client computers with read or write access to a specified file in the virtual file system. The method includes the at least one of the client computers sending to the namespace server a first metadata access request in accordance with a file mapping protocol for metadata access to the specified file, and the namespace server responding to the first metadata access request by determining that the specified file is not being migrated. Upon determining that the specified file is not being migrated, the namespace server returns to the at least one of the client computers a redirection reply redirecting the at least one of the client computers to the one of the file servers managing a respective one of the file systems including the specified file, and the at least one of the client computers receiving the redirection reply and using the redirection reply to obtain file mapping metadata from the one of the file servers managing the respective one of the file systems including the specified file, and using the file mapping metadata to produce a block access request sent to one of the storage arrays storing file data of the specified file to read data from or write data to the specified file. The at least one of the client computers sends a second metadata access request in accordance with the file mapping protocol to the namespace server for metadata access to the specified file, and the namespace server responds to the second metadata access request by determining that the specified file is being migrated. Upon determining that the specified file is being migrated, the namespace server returns to the at least one of the client computers a metadata access denied reply, and the at least one of the client computers receives the metadata access denied reply and responds to the metadata access denied reply by sending to the namespace server a read or write request in accordance with the Network File System (NFS) protocol or the Common Internet File System (CIFS) protocol to read data from or write data to the specified file as requested by the at least one of the client computers.

In accordance with another aspect, the invention provides a namespace server for use in a data processing system including client computers and file servers. The namespace server includes at least one network adapter for receiving file access requests from the client computers and returning replies to the client computers in accordance with the Network File System (NFS) protocol or the Common Internet File System (CIFS) protocol, and for sending file access requests to the file servers and receiving replies from the file servers in accordance with the Network File System (NFS) protocol or the Common Internet File System (CIFS) protocol, and for receiving metadata access requests from the client computers and returning replies in accordance with a file mapping protocol. The namespace server also includes a memory for storing a namespace directory hierarchy of a virtual file system including files of respective file systems managed by the file servers. The namespace server further includes at least one processor coupled to the network adapter and to the memory for providing the client computers with file access to the virtual file system in accordance with the Network File System (NFS) protocol or the Common Internet File System (CIFS) protocol and metadata access to the virtual file system in accordance with the file mapping protocol. The at least one processor is programmed to respond to a metadata access request from at least one of the client computers in accordance with the file mapping protocol for metadata access to a specified file in the virtual file system by determining whether or not the specified file is being migrated, and upon determining that the specified file is not being migrated, returning to the at least one of the client computers a metadata redirection reply redirecting the at least one of the client computers to one of the file servers managing a respective one of the file systems including the specified file, and upon determining that the specified file is being migrated, returning to the at least one of the client computers a metadata access denied reply. The at least one processor is programmed to respond to a read or write request from the at least one of the client computers in accordance with the Network File System (NFS) protocol or the Common Internet File System (CIFS) protocol by reading data from or writing data to the specified file while the specified file is being migrated by temporarily interrupting the migration of the specified file to read data from or write data to the specified file as requested by the at least one of the client computers.

In accordance with still another aspect, the invention provides a data processing network. The data processing network includes client computers, file servers managing respective file systems, storage arrays storing file data of the file systems, and a namespace server. The client computers are linked to the namespace server for transmission of file access requests in accordance with the Network File System (NFS) protocol or the Common Internet File System (CIFS) protocol from the client computers to the namespace server and for return of replies from the namespace server to the client computers. The namespace server is linked to the file servers for transmission of file access requests in accordance with the Network File System (NFS) protocol or the Common Internet File System (CIFS) protocol from the namespace server to the file servers and for return of replies from the file servers to the namespace server. The namespace server is programmed to respond to file access requests from the client computers to the namespace server in accordance with the Network File System (NFS) protocol or the Common Internet File System (CIFS) protocol for reading data from and writing data to files in a virtual file system by the namespace server accessing a namespace directory hierarchy to determine respective ones of the file servers that manage respective file systems of the files in the virtual file system and for sending file access requests from the namespace server to the respective ones of the file servers in accordance with the Network File System (NFS) protocol or the Common Internet File System (CIFS) protocol to read data from and write data to the files in the respective file systems managed by the respective ones of the file servers. The namespace server is also programmed to migrate a specified file in the virtual file system from a first file system managed by a first one of the file servers to a second file system managed by a second one of the file servers by sending file access requests from the namespace server to the first file server and to the second file server in accordance with the Network File System (NFS) protocol or the Common Internet File System (CIFS) protocol to copy the file from the first file system to the second file system. The namespace server also is programmed to respond to a file access request from at least one of the client computers to the namespace server in accordance with the Network File System (NFS) protocol or the Common Internet File System (CIFS) protocol for reading from or writing to the specified file in the virtual file system by the namespace server determining that the specified file is being migrated from the first one of the file systems to the second one of the file systems and temporarily interrupting the copying of the specified file from the first file system to the second file system to read data from or write data to the specified file by sending a file access request to the first one of the file servers or to the second one of the file servers so that the migration of the specified file is transparent to the read or write access of the specified file in accordance with the Network File System (NFS) protocol or the Common Internet File System (CIFS) protocol by the at least one of the client computers. The client computers are linked to the storage arrays in a storage area network (SAN) for block access to the file data in the storage arrays. The client computers are also linked to the namespace server and to the file servers for transmission of metadata access requests in accordance with a file mapping protocol from the client computers to the namespace server and from the client computers to the file servers. The file servers are programmed to respond to the metadata access requests from the client computers by returning file mapping metadata to the client computers. The file mapping metadata includes block addresses of file data in the storage arrays. The client computers are programmed to use the file mapping metadata for producing block access requests sent over the storage area network to the storage arrays for reading data from or writing data to the block addresses of the file data in the storage arrays. The namespace server is further programmed to respond to a metadata access request sent from the at least one of the client computers to the namespace server in accordance with the file mapping protocol for reading from or writing to the specified file in the virtual file system by the namespace server determining whether or not the specified file is being migrated between the file systems, and upon determining that the specified file is not being migrated between the file systems, returning a redirection reply to the at least one of the client computers, the redirection reply redirecting the at least one of the client computers to one of the file servers managing access to the specified file, and otherwise upon determining that the specified file is being migrated between the file systems, returning a reply indicating that metadata access to the specified file using the file mapping protocol is denied. The at least one of the client computers is programmed to respond to the redirection reply from the namespace server by sending a metadata access request in accordance with the file mapping protocol to the one of the file servers managing access to the specified file to obtain file mapping metadata for the specified file from the one of the file servers managing access to the specified file. The at least one of the client computers is also programmed to respond to the reply indicating that metadata access to the specified file using the file mapping protocol is denied by sending a file access request in accordance with the Network File System (NFS) protocol or the Common Internet File System (CIFS) protocol to the namespace server for reading from or writing to the specified file in the virtual file system so that the at least one of the client computers reads data from or writes data to the specified file using the Network File System (NFS) protocol or the Common Internet File System (CIFS) protocol when the specified file is being migrated between the file systems.

BRIEF DESCRIPTION OF THE DRAWINGS

Additional features and advantages of the invention will be described below with reference to the drawings, in which.

Figure 1:
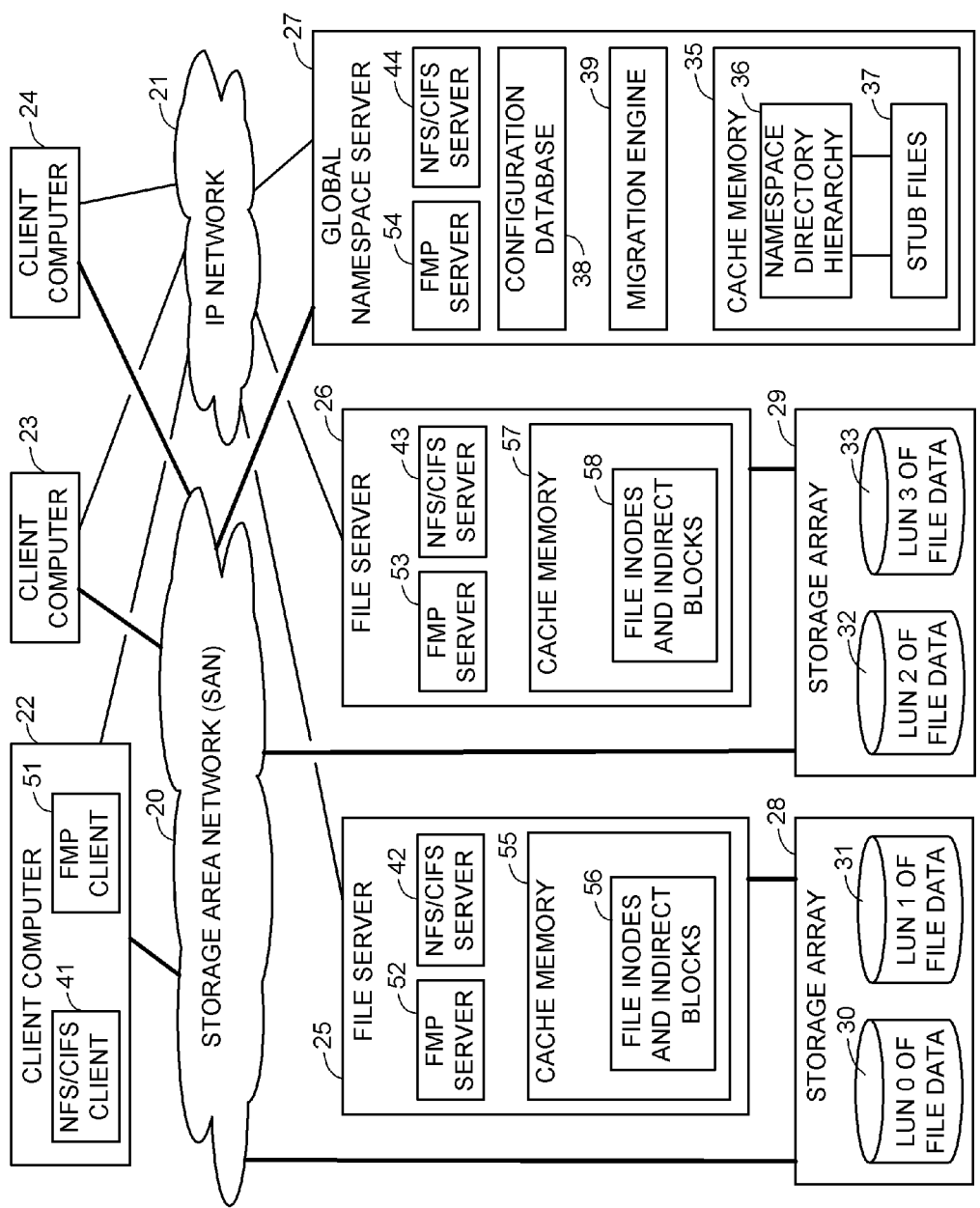
FIG. 1 is a block diagram of a data processing system incorporating the present invention.

While the invention is susceptible to various modifications and alternative forms, a specific embodiment thereof has been shown in the drawings and will be described in detail. It should be understood, however, that it is not intended to limit the invention to the particular form shown, but on the contrary, the intention is to cover all modifications, equivalents, and alternatives falling within the scope of the invention as defined by the appended claims.

DETAILED DESCRIPTION OF THE PREFERRED EMBODIMENT

With reference to FIG. 1, there is shown a data processing system including a storage area network (SAN) 20, and an Internet Protocol (IP) network 21. The Internet Protocol network 21 includes client computers 22, 23, 24, file servers 25, 26, and a global namespace server 27. The storage area network 20 links each of the client computers 22, 23, 24 directly to a storage array 28 used by the file server 25 and directly to a storage array 29 used by the file server 26.

The storage array 28 provides the clients 22, 23, 24 and the file server 25 with access to logical unit numbers (LUNS) 0 and 1 of data storage 30 and 31 using the Small Computer System Interface (SCSI) protocol over a network protocol of the storage area network (SAN) 20. For example, the network protocol of the storage area network 20 is the IP protocol, the InfiniBand (IB) protocol, the Fibre Channel (FC) protocol, or the Gigabit Ethernet (GE) protocol. In a similar fashion, the storage array 29 provides the clients 22, 23, 24 and the file server 26 with access to logical unit numbers (LUNS) 2 and 3 of data storage 32 and 33 also using the SCSI protocol over the network protocol of the storage area network 20.

The global namespace server 27 allows each of the client computers 22, 23, 24 to see a plurality of file systems mounted on different ones of the file servers 25, 26. In particular, when accessed by a client using the NFS or CIFS file access protocol, the client sees one virtual file system including virtual directories managed by the global namespace server, and files stored in the file servers 25 and 26. Each file that is stored in the file server 25 or 26 and is included in the virtual file system may have a name in the virtual file system that is different from the name of the file in the file server 25 or 26. Therefore, the name of a file in the virtual file system need not be changed if the file is renamed in the file server 25 or 26, or when a file in the virtual file system becomes disassociated with a source file and re-associated with a target file during migration of the file between the file servers 25, 26.

In one specific implementation, any file that is stored in the file server 25 or 26 and is included in the virtual file system will not be a directory and instead will be a data file, and every data file of the virtual file system will be a file stored in a file server that is not the global namespace server. Thus, upon searching down the inode hierarchy of the virtual file system and reaching a leaf inode in the hierarchy and finding that this leaf inode is not a directory, then this leaf inode should be a data file stored in a file server that is not the global namespace server.

In a preferred implementation, the global namespace server 27 includes a cache memory 25 for caching a namespace directory hierarchy 36 of the virtual file system, and respective stub files 37 for the data files of the virtual file system. The namespace directory hierarchy 26 and the stub files 37, for example, are fetched when needed from disk storage of one of the storage arrays 28, 29.

Each of the stub files 37 includes the name of the data file in the virtual file system, a globally unique file system identifier (FSID) for the file system storing the data file in a file server that is not the global namespace server, and a file handle (FID) of the data file in the file system storing the data file in the file server that is not the global namespace server. The global namespace server 27 includes a configuration database 38 storing a file server identifier and at least one IP network address in association with each file system identifier stored in the stub files 37. Therefore, to access a data file given a pathname of the data file in the virtual file system, the global namespace server 27 searches down the namespace directory hierarchy 36 as specified by the pathname until reaching one of the stub files 37, and then accesses the stub file 37 to read a file system ID and a file handle, and then uses the file system ID as a search key to find the IP address of the file server storing the file. To access the file, the global namespace server

27 may then send a NFS or a CIFS request including the file handle to the IP address of the file server storing the file.

The global namespace server 37 is programmed with a migration engine 39 for migration of the data files in a manner transparent to client access when the clients are accessing the virtual file system using the NFS or CIFS protocol. For example, each of the stub files stores a migration flag attribute indicating whether or not the corresponding data file is presently being migrated. If the corresponding data file is presently being migrated, the stub file also includes a file system ID and a file handle for the target file of the migration, and pointer to the migration process.

At least one of the client computers 22 is programmed for access to the virtual file system using a file mapping protocol in addition to the NFS or CIFS file access protocol. For example, the client computer 22 is programmed with a NFS or CIFS client 41 for access to the virtual file system using the NFS or CIFS protocol, and a file mapping protocol (FMP) client 51 using the file mapping protocol, as further described below.

In each file server 25, 26, the respective FMP server 52, 53 provides the FMP client 51 with access to file mapping metadata of a shared disk file system managed by the file server. For example, the file server 25 maintains a cache memory 55 of recently accessed file inodes and indirect blocks 56 of files managed by the file server 25. The file inodes and indirect blocks 56 are fetched as needed from the storage array 28. The file inodes and indirect blocks 36 include pointers to logical block addresses of file data in the logical units of storage 30, 31 in the storage array 28. In a similar fashion, the file server 26 maintains a cache memory 57 of recently accessed file inodes and indirect blocks 58 of files managed by the file server 26. The file inodes and indirect blocks 58 are fetched as needed from the storage array 29. The file inodes and indirect blocks 58 include pointers to logical block addresses of file data in the logical units of storage 32, 33 in the storage array 29.

Figures 2, 4:
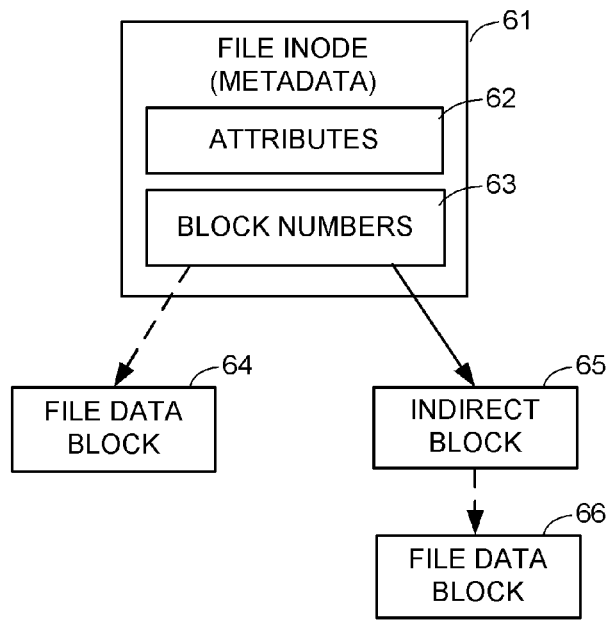
FIG. 2 is a block diagram of a file.
FIG. 4 is a block diagram of an extent map of file mapping metadata.

For example, as shown in FIG. 2, the metadata of an inode 61 for a file includes attributes 62 and block numbers 63. The block numbers 63 point to other file system blocks such as a file data block 64 and an indirect block 65. The indirect block 65 may point to additional file data blocks and indirect blocks. In FIG. 2, for example, the indirect block 65 points to a file data block 66. The file inode 61, the indirect block 65, and the file data blocks 64, 66 typically have the same size, and this file system block size is multiple of the logical block size of data stored on the storage arrays 28, 29. For example, the file system block size is 8 kilobytes, and the logical block size is the standard disk block or disk sector size of 512 bytes. Further details regarding file system metadata and organization of file system blocks can be found in chapter 9 of Uresh Vahalia, *UNIX Internals: The New Frontier*, Prentice-Hall, Inc., 1996, p. 261-289.

Figure 3:
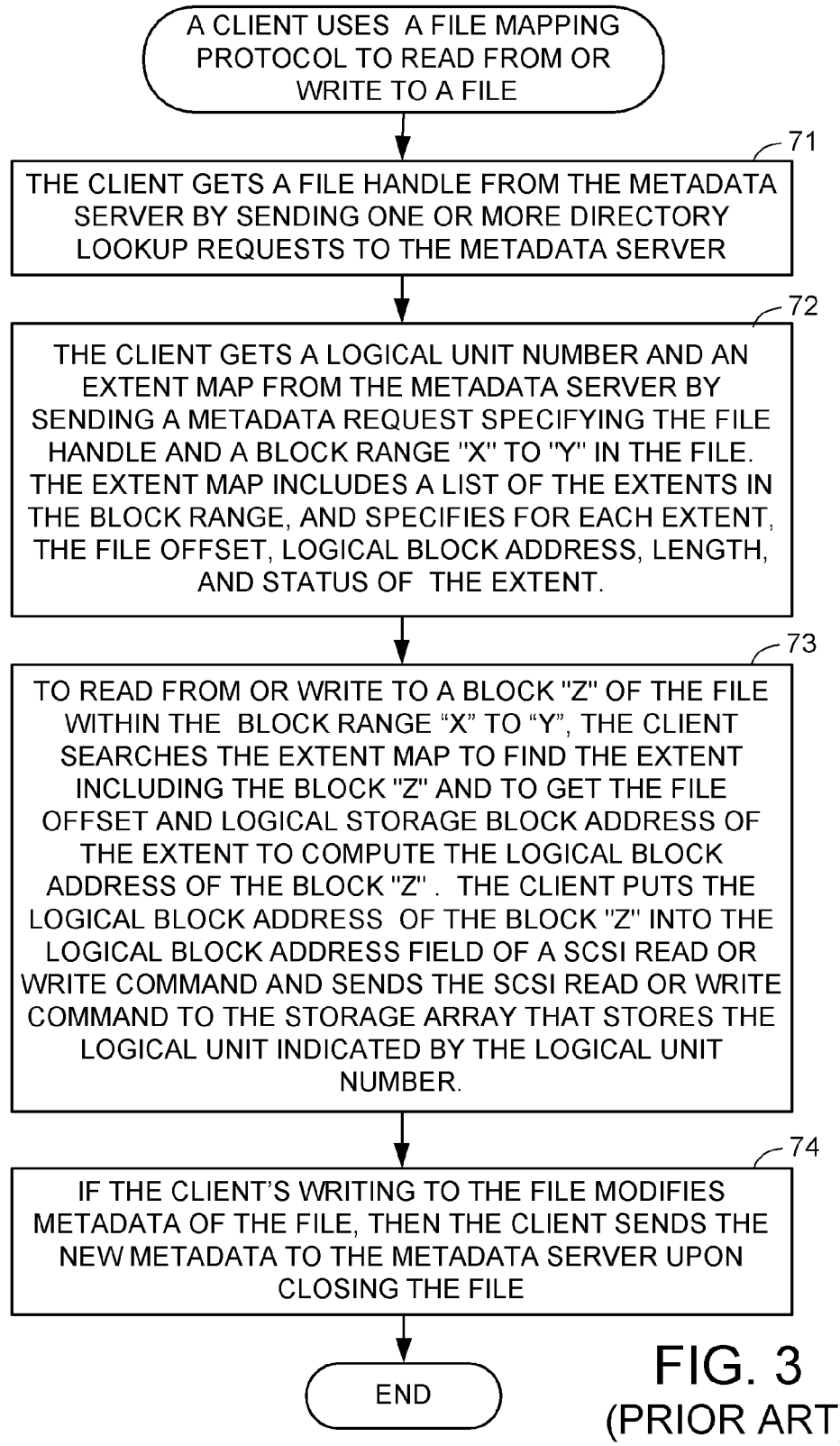
FIG. 3 is a flowchart of a file mapping protocol used by a client to obtain file mapping metadata from a metadata server and to use the file mapping metadata to access file data in a storage array.

FIG. 3 shows a flowchart of a conventional file mapping protocol used by a client computer for accessing a metadata server and a storage array. In a first step 71, the client gets a file handle from the metadata server by sending one or more directory lookup requests to the metadata server. For example, the client uses the NFS or CIFS file access protocol to get a file handle for a file specified by a pathname.

In step 72, the client gets a logical unit number and an extent map from the metadata server by sending a metadata request specifying the file handle and a block range "X" to "Y" in the file. As shown in FIG. 4, such an extent map 70 includes a list of extents in the block range, and specifies, for each extent, a file offset, a logical block address, a length, and a status. Each extent is a range of contiguous logical block addresses of file data. The length specifies the number of logical blocks in the extent. The status, for example, specifies whether or not the extent is valid for reading and writing, valid for read only, invalid, or is a hole.

In step 73 of FIG. 3, to read from or write to a block "Z" of the file within the block range of "X" to "Y", the client searches the extent map to find the extent including the block "Z" and to get the file offset and logical storage block address of the extent to compute the corresponding logical block address of the block "Z." Assuming that the block "Z" is found in an offset that is valid for reading or writing as desired, the client puts the corresponding logical block address for the block "Z" into the logical block address field of a SCSI read or write command and sends the SCSI read or write command to the storage array that stores the logical unit indicated by the logical unit number from the metadata server.

In step 74, if the client's writing to the file modifies metadata of the file, then the client sends the new metadata to the metadata server upon closing the file.

Figure 5:
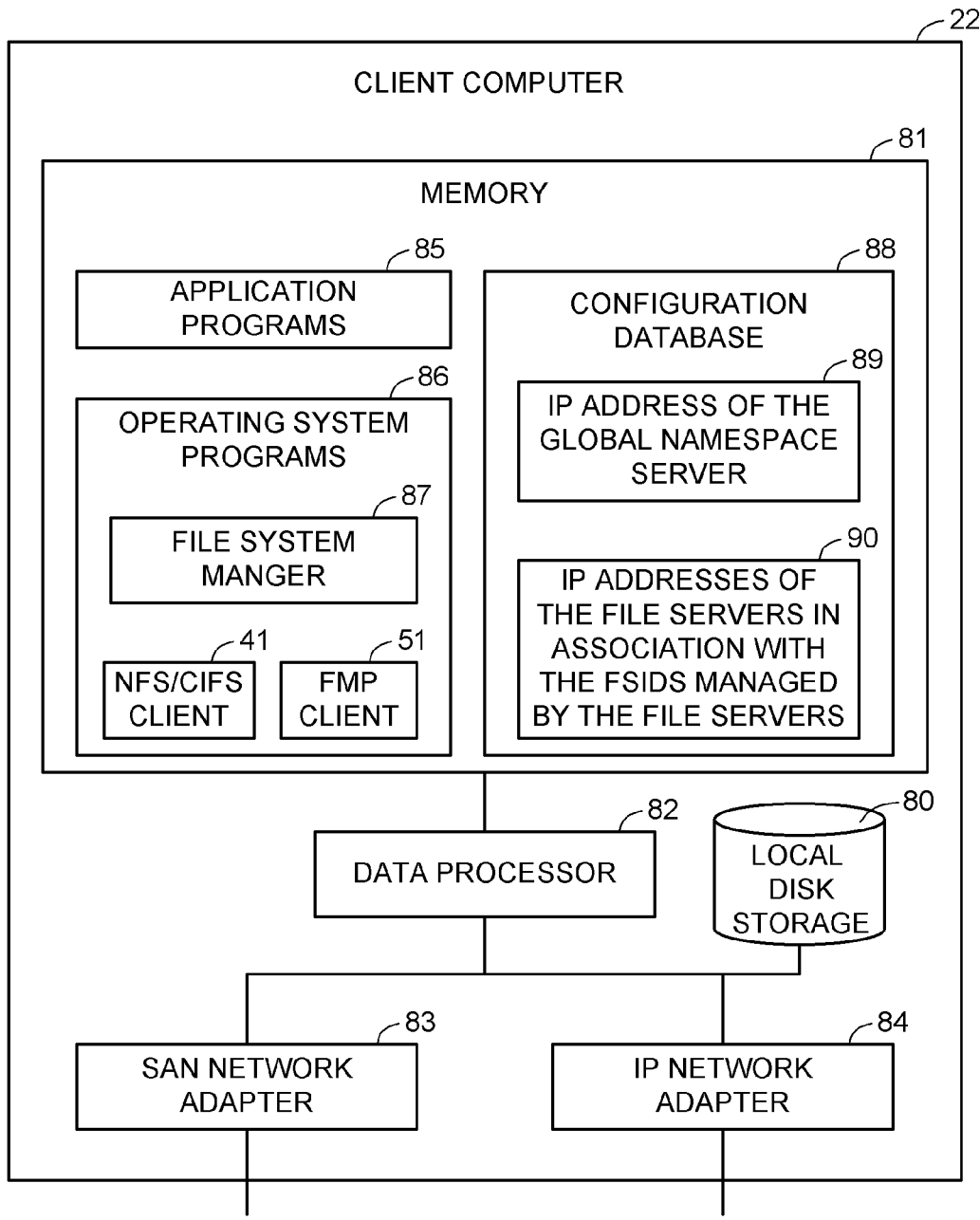
FIG. 5 is a block diagram of a client computer introduced in FIG. 1.

FIG. 5 shows a preferred construction for the client computer 22. The client computer 22 includes local disk storage 80, random access memory 81, a data processor 82, a SAN network adapter 83 for linking the client computer 22 into the SAN network (20 in FIG. 1), and an IP network adapter 84 for linking the client computer 22 into the IP network (21 in FIG. 1). The memory 81 stores application programs 85 and operating system programs 86. The operating system programs 86 include a file system manager 87, an NFS or CIFS client 41, and an FMP client 51.

The file system manager 87, for example, manages a UNIX (Trademark) based file system including a hierarchy of directories and data files depending from a root directory. This hierarchy of directories and data files may include file systems that have been exported to the client from network file servers and mounted into the hierarchy depending from the root directory. In response to a call from one of the application programs 85 for access to a directory or data file in the hierarchy depending from the root directory, if the file system manager determines that the directory or data file to be accessed has been exported from a network file server, then the file system manager calls the NFS/CIFS client program 41 for access to the directory or file in the network file server using the NFS or CIFS network file access protocol. If the file system manager 87 requests the NFS/CIFS client 41 to read data from or write data to a data file instead of a directory, then the NFS/CIFS client may invoke the FMP client program 51 to use the file mapping protocol to read data from or write data to the data file, as will be further described below with reference to FIGS. 10-13.

For access to file systems exported from network file servers, the memory 81 stores a configuration database 88 loaded from the local disk storage 80. The configuration database 88 includes an IP address 89 of the global namespace server (27 in FIG. 1), and a table 90 of IP addresses of the network file servers (25, 26 in FIG. 1) stored in association with the file system identifiers (FSIDS) managed by the respective file servers. For example, the client computer 22 is configured by mounting the virtual file system (i.e., the namespace directory hierarchy 36 of FIG. 1) of the global namespace server into the directory hierarchy of the file system manager 87 so that the NFS/CIFS client 41 sends NFS or CIFS network file access requests to the IP address 89 of the global namespace server.

The FMP client 51 may send metadata access requests in accordance with the file mapping protocol to the IP address 89 of the global namespace server, resulting in the global namespace server returning a redirection reply specifying a FSID. In this case, the FMP client 51 does a lookup for the IP address of a file server in the table 90 using the FSID as a search key, in order to send a metadata access request in accordance with the file mapping protocol to the file server managing the file system identified by the FSID.

Figure 6:
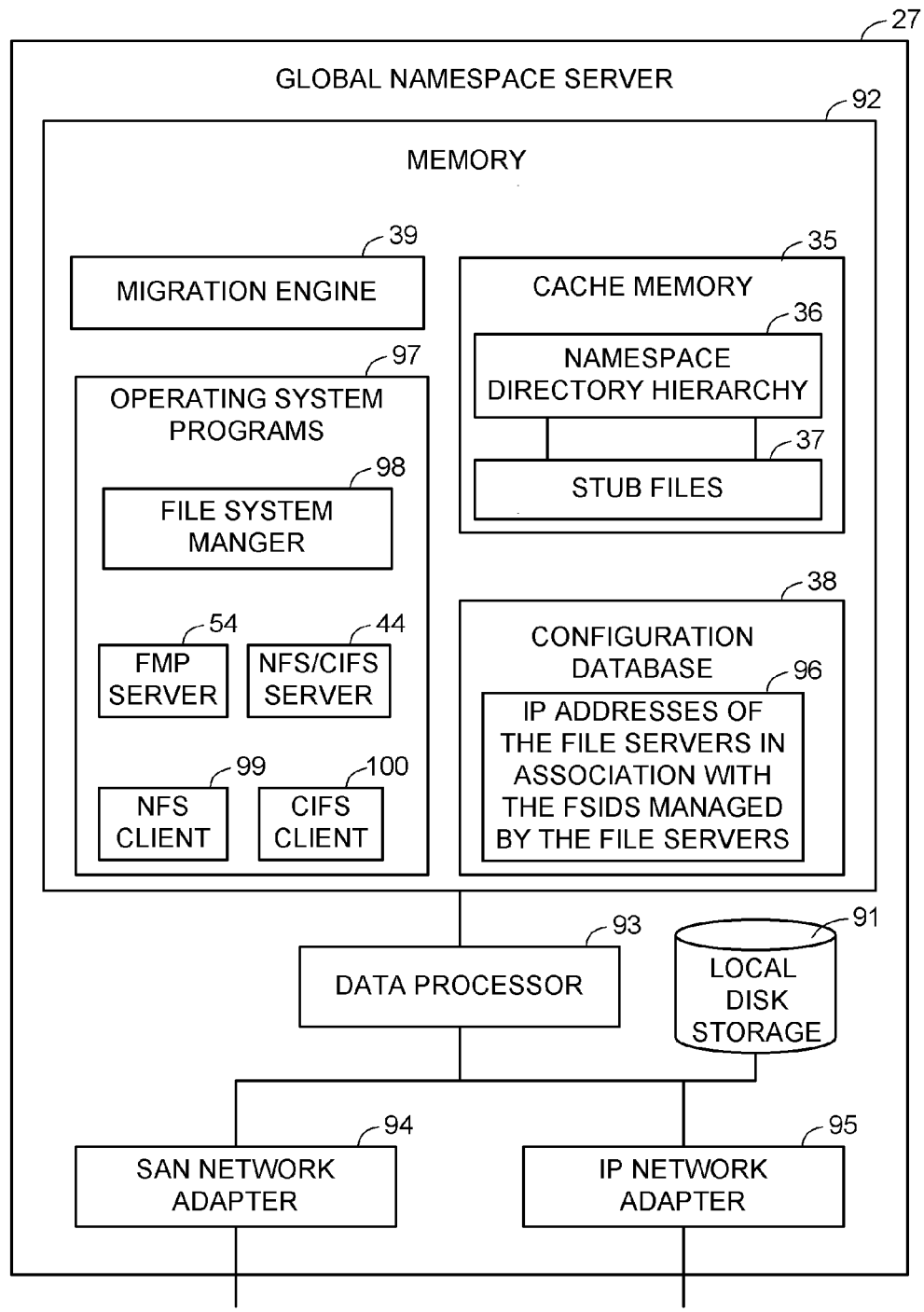
FIG. 6 is a block diagram of a global namespace server introduced in FIG. 1.

FIG. 6 shows a preferred construction for the global namespace server 27. The global namespace server 27 includes local disk storage 91, random access memory 92, a data processor 93, a SAN network adapter 94 for linking the global namespace server 27 into the SAN network (20 in FIG. 1), and an IP network adapter 95 for linking the global namespace server 27 into the IP network (21 in FIG. 1). The memory 92 stores the migration engine program 39 and operating system programs 97. The operating system programs 97 include a file system manager 98, the NFS or CIFS server 44, the FMP server 54, an NFS client 99, and a CIFS client 100.

The file system manager 98, for example, manages a UNIX (Trademark) based file system including the namespace directory hierarchy 36 and the stub files 37. The file system manager 87 is programmed so that when the NFS/CIFS server 44 requests a read or write of one of the stub files 37, the file system manager 87 instead reads or writes data to a corresponding data file in a respective one of the file servers (25 or 26 in FIG. 1), as indicted by a FSID and FID stored in the stub file.

In a specific implementation, the NFS/CIFS server 44 is a multi-protocol NFS and CIFS server, and the file servers in the data processing system of FIG. 1 may include NFS only file servers, CIFS only file servers, and multi-protocol NFS and CIFS file servers. The file system manager accesses the configuration database 38 to determine whether the respective file server storing the corresponding data file is an NFS only server, a CIFS only server, or a multi-protocol NFS and CIFS server. If the respective file server is a multi-protocol NFS and CIFS server, the file system manager 98 translates the file handle in the NFS or CIFS file read or write request received by the NFS/CIFS server 44 and forwards the NFS or CIFS request including the translated file handle to the respective file server. If the respective file server is an NFS only server and the file read or write request received by the NFS/CIFS server is a CIFS request, then the file system manager 98 also translates the CIFS read or write request into a NFS read or write request and sends the NFS read or write request to the respective file server. If the respective file server is a CIFS only server and the file read or write request received by the NFS/CIFS server 44 is a NFS request, then the file system manager 98 also translates the NFS read or write request into a CIFS read or write request and sends the CIFS read or write request to the respective file server.

Figure 7:
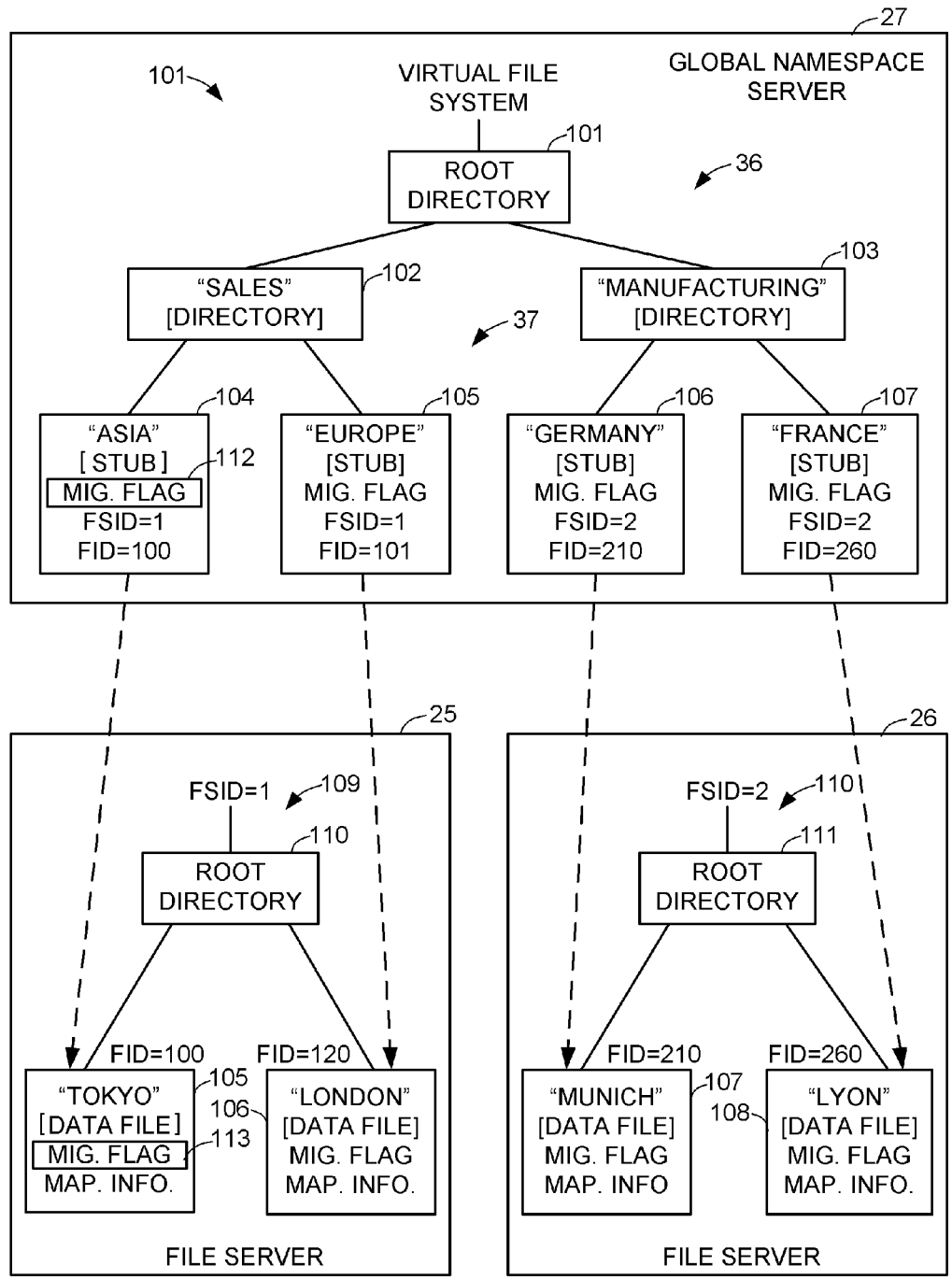
FIG. 7 is a block diagram of a virtual file system including a namespace directory hierarchy managed by the global namespace server of FIG. 1 and data files in file systems managed by file servers of FIG. 1.

FIG. 7 shows a specific example of a virtual file system 101 including the namespace directory hierarchy 36 managed by the global namespace server and the data files 105, 106 in a first file system 109 managed the file server 25 and the data files 107, 108 in a second file system 110 managed by the file server 26. The virtual file system 101 has a root directory 101 including a first sub-directory 102 named "SALES" and a second sub-directory 103 named "MANUFACTURING". The sub-directory 102 named "SALES" contains a data file 105 named "ASIA" in the virtual file system 101 but named "TOKYO" in the file system 109, and a data file 106 named "EUROPE" in the virtual file system 101 but named "LONDON" in the file system 109. The sub-directory 103 named "MANUFACTURING" contains a data file 107 named "GERMANY" in the virtual file system 101 but named "MUNICH" in the file system 110, and a data file 107 named "FRANCE" in the virtual file system 101 but named "LYON" in the file system 110. The global namespace server 27 maintains a respective stub file 104, 105, 106, 107 for each data file 105, 106, 107, 108 in order to link each data file 105, 106, 107, 108 to the namespace directory hierarchy 101.

Figure 8:
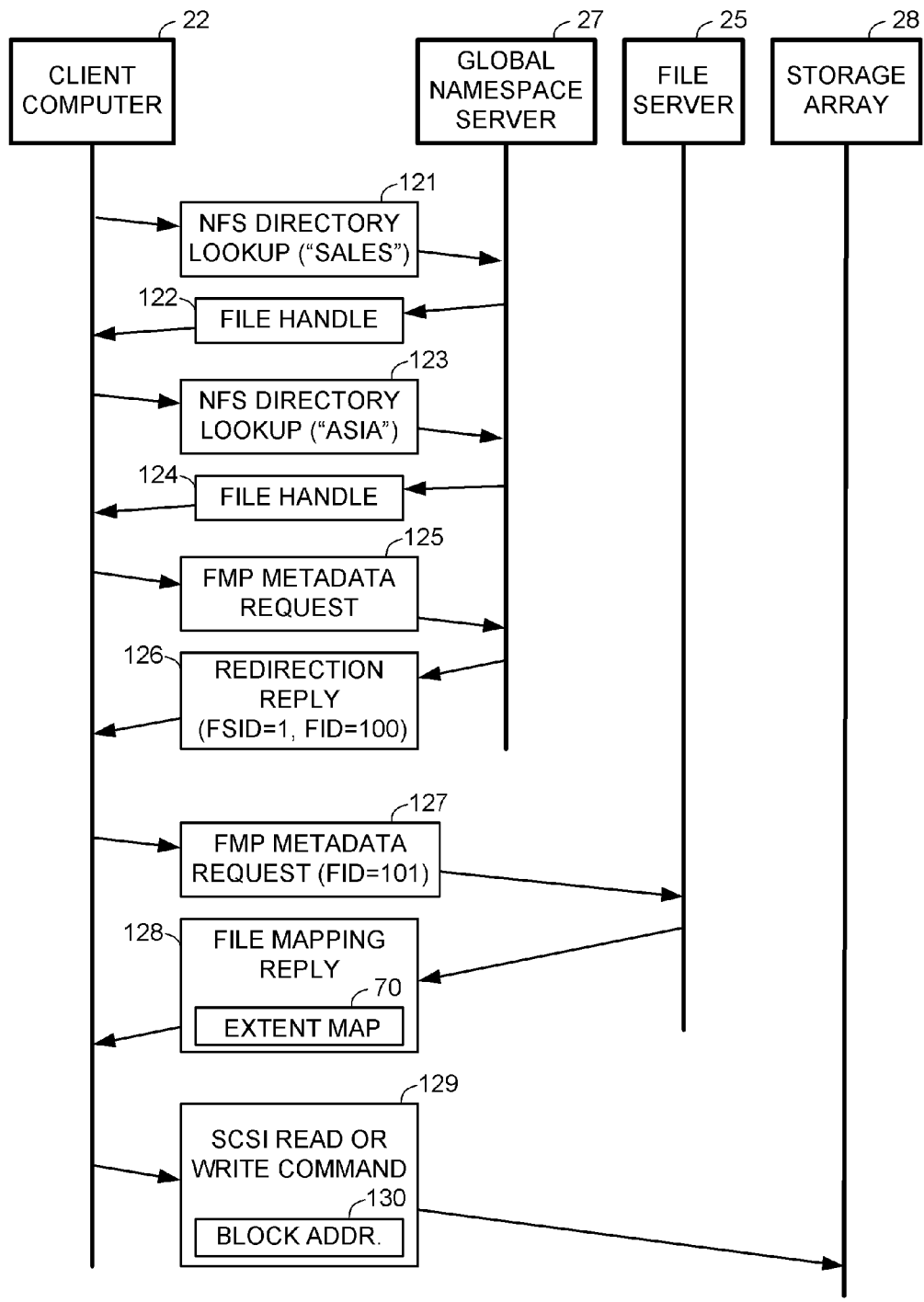
FIG. 8 is a flow diagram showing requests and replies when a client computer of FIG. 1 uses the file mapping protocol to read from or write to a data file when the data file is not being migrated between the file servers in FIG. 1.

FIG. 8 shows requests and replies when the client computer 22 uses the file mapping protocol to read from or write to the data file (105 in FIG. 7) when the data file is not being migrated. The data file has the pathname "/SALES/ASIA" in the virtual file system (101 in FIG. 7). The client computer 22 sends to the global namespace server 27 a NFS directory lookup request 121 requesting the global namespace server to look for the name "SALES" in the root directory (101 in FIG. 7) of the virtual file system. The global namespace server 27 finds the name "SALES" in the root directory, and returns a file handle 122 to the "SALES" sub-directory (102 in FIG. 7). The client computer 22 includes the file handle 122 in another NFS directory lookup request 123 requesting the global namespace server 27 to look for the name "ASIA" in the "SALES" sub-directory. The client computer 22 sends the directory lookup request 123 to the global namespace server 27. The global namespace server finds the name "ASIA" in the "SALES" sub-directory, and returns a file handle 124 to the "ASIA" stub file (104 in FIG. 7).

The client computer 22 includes the file handle 124 in a FMP metadata request 125 requesting the global namespace server 27 for metadata access to the "ASIA" stub file. The client computer 22 sends the FMP metadata request 125 to the global namespace server 27. The global namespace server 27 responds to the FMP metadata request 125 by accessing the "ASIA" stub file (104 in FIG. 7) to read a migration flag (112) and the FSID=1 and the FID=100 from the "ASIA" stub file. Upon finding that the migration flag is not set, indicating that the data file corresponding to the stub file is not being migrated, the global namespace server 27 returns a redirection reply 126 including the FSID=1 and FID=100 read from the "ASIA" stub file.

The client computer 22 responds to the redirection reply 126 by finding the IP address of the file server 25 associated with the FSID=1 in the IP address table (90 in FIG. 5) in its configuration database (88 in FIG. 5), and by sending an FMP metadata request 127 including the FID=100 to the IP address of the file server 25. The file server 25 responds to the FMP metadata request 127 by returning a file mapping reply 128 including the extent map 70.

The client computer 22 responds to the file mapping reply 128 by using the extent map to compute a logical block address 130 of the file data to be read from or written to the file (105 in FIG. 7) specified by the pathname "/SALES/ASIA". The client computer 22 puts the logical block address 130 in the logical block address field of a SCSI read or write command 129 sent to the storage array 28 in order to read data from or write data to the specified file.

Figure 9:
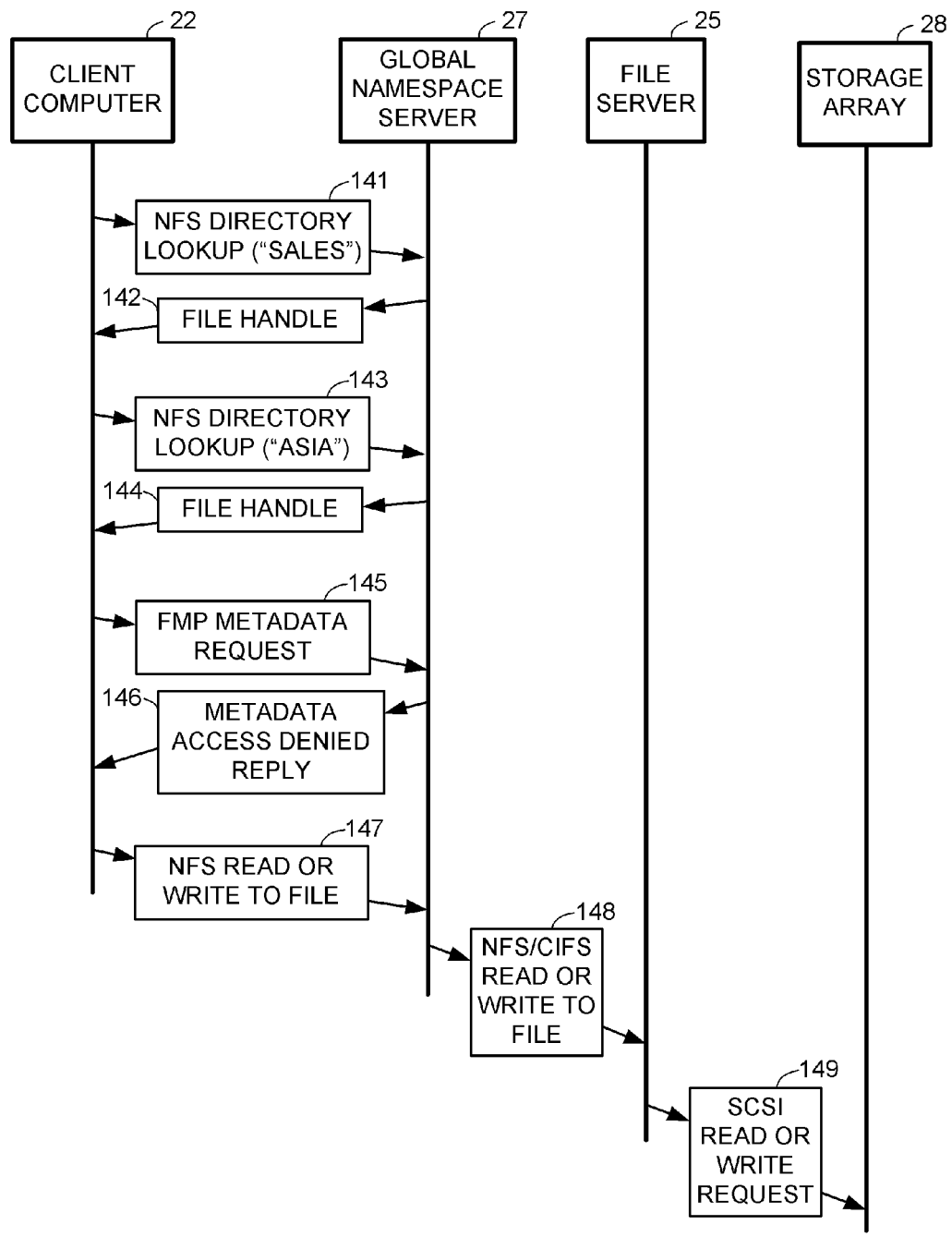
FIG. 9 is a flow diagram showing requests and replies when a client computer of FIG. 1 uses the file mapping protocol to read from or write to a data file when the data file is being migrated between the file servers in FIG. 1.

FIG. 9 shows requests and replies when the client computer 22 uses the file mapping protocol to read from or write to the data file named "/SALES/ASIA" (105 in FIG. 7) when this data file is being migrated. In a fashion similar to FIG. 7, the client computer sends a NFS directory lookup request 141 to the global namespace server 27 to obtain a file handle 142 to the "SALES" sub-directory, and then includes the file handle 142 in a NFS directory lookup request 143 to the global namespace server to obtain a file handle 144 to the "ASIA" stub file (104 in FIG. 7). The client computer 22 includes the file handle 144 in a FMP metadata request 125 requesting the global namespace server 27 for metadata access to the "ASIA" stub file.

The global namespace server 27 responds to the FMP metadata request 145 by accessing the "ASIA" stub file (104 in FIG. 7) to read the migration flag (112) and the FSID=1 and the FID=100 from the "ASIA" stub file. Upon finding that the migration flag is set, indicating that the data file corresponding to the stub file is being migrated, the global namespace server 27 returns a metadata access denied reply 146 to the client computer 22. The client computer 22 responds to the metadata access denied reply 146 by including the file handle 144 in a NFS request 147 to read from or write to the file. The global namespace server 27 responds to the NFS request 147 by accessing the "ASIA" stub file (104 in FIG. 7) to read the migration flag (112) and the FSID=1 and the FID=100 from the "ASIA" stub file. Upon finding that the migration flag is set, indicating that the data file corresponding to the sub file is being migrated, the global namespace server 27 temporarily interrupts the migration of the data file in order to read from or write to the data file. For the case of FIG. 9, it is assumed that the file data to be read from or written to is stored in the file server 25, so that the global namespace server 27 sends an NFS or CIFS request to the file server 25 to read from or write to the file. The file server 25 responds by sending at least one SCSI read or write request 149 to the storage array 28 storing the file data.

Figure 10:
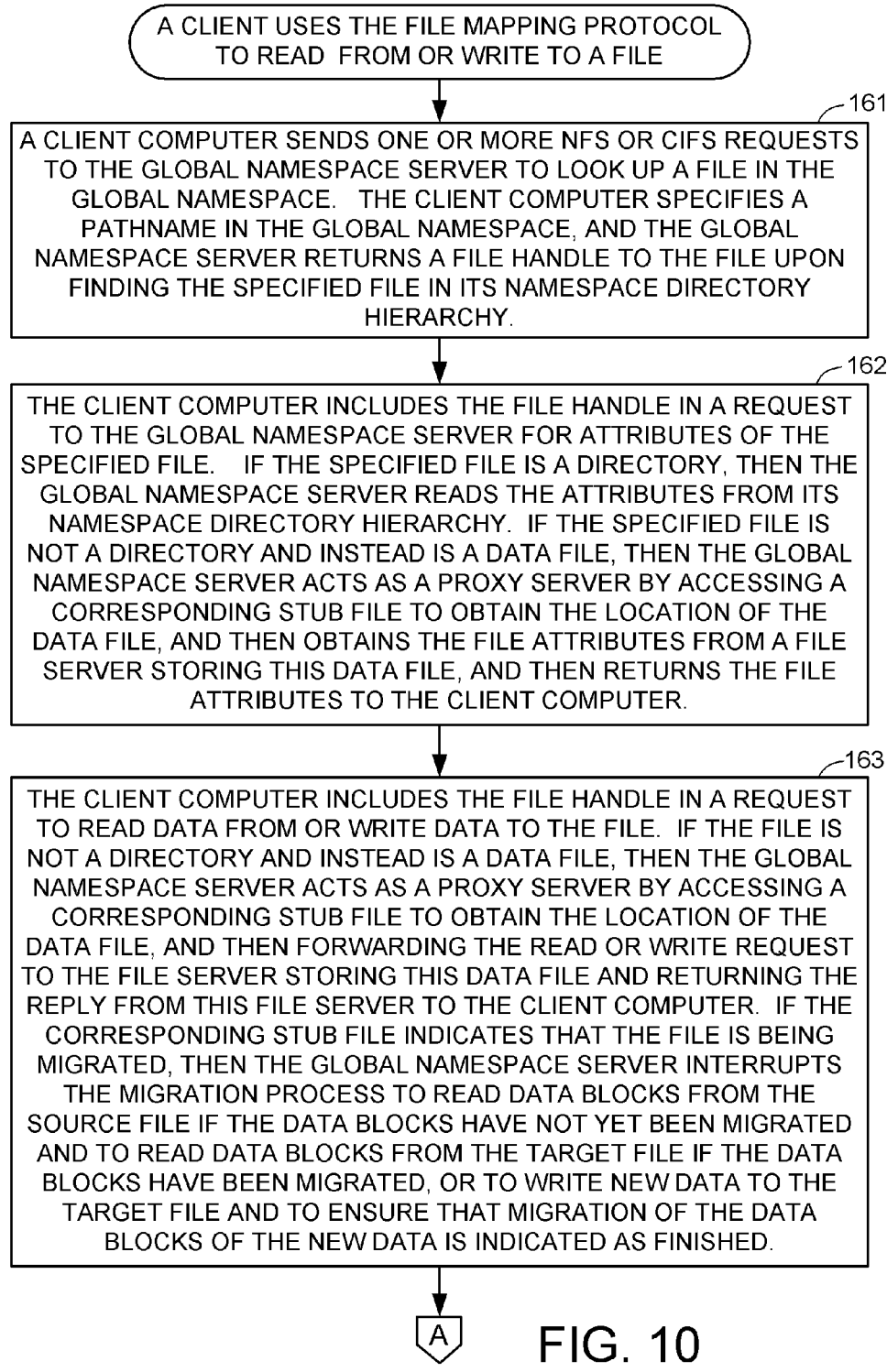
FIGS. 10 and 11 together comprise a flowchart of a method of high-speed client access to file data in the data processing system of FIG. 1.
Figure 11:
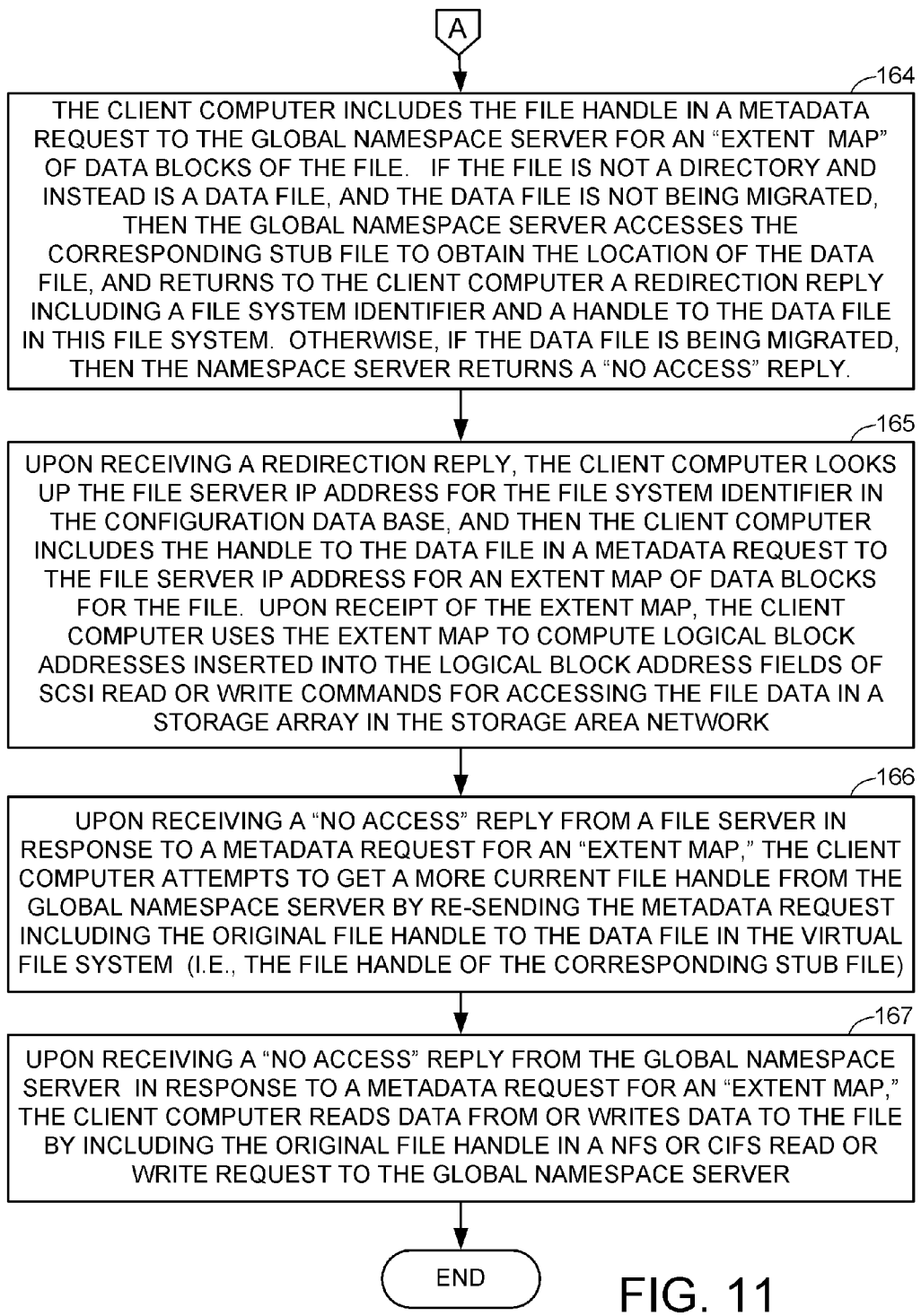

FIGS. 10 and 11 show further details of the interaction between a client computer, the global namespace server, and a file server in the data processing network of FIG. 1 when a client computer reads from or writes to a file in a storage array. In a first step 161 of FIG. 6, a client computer sends one or more NFS or CIFS requests to the global namespace server to look up a file in the virtual file system providing the global namespace. The client computer specifies a pathname in the global namespace, and the global namespace server returns a file handle to the file upon finding the specified file in its namespace directory hierarchy. If the specified file is a data file and not a directory in the namespace directory hierarchy, then the file handle returned by the global namespace server in response to a NFS or CIFS directory lookup request is the file handle of a stub file corresponding to the data file. In other words, the file handle of the corresponding stub file is the virtual file handle for the data file.

In step 162, the client computer includes the file handle in a request to the global namespace server for attribute of the specified file. If the specified file is a directory, then the global namespace server reads the attributes from its namespace directory hierarchy. If the specified file is not a directory and instead is a data file, then the global namespace server acts as a proxy server by accessing a corresponding stub file to obtain the location of the data file, and then obtains the file attributes from a file server storing this data file, and then returns the file attributes to the client.

In step 163, the client may include the file handle in a request to read data from or write data to the file. If the file is not a directory and instead is a data file, then the global namespace server acts as a proxy server by accessing a corresponding stub file to obtain the location of the data file, and then forwarding the read or write request to the file server storing this data file and returning the reply from this file server to the client. If the corresponding stub file indicates that the file is being migrated, then the global namespace server interrupts the migration process to read data blocks from the source file if the data blocks have not yet been migrated and to read data blocks from the target file if the data blocks have been migrated, or to write new data to the target file and to ensure than migration of the data blocks of the new data is indicated as finished. Execution continues from step 163 of FIG. 10 to step 164 of FIG. 11.

In step 164 of FIG. 11, the client computer includes the file handle in a metadata request to the global namespace server for an "extent map" of data blocks of the file. If the file is not a directory and instead is a data file, and the data file is not being migrated, then the global namespace server accesses the corresponding stub file to obtain the location of the data file, and returns to the client a redirection reply including a file system identifier and a handle of the file in the file system identified by this file system identifier. Otherwise, if the data file is being migrated, then the global namespace server returns a "no access" reply to the client computer.

In step 165, upon receiving a redirection reply including a file system identifier and a file handle, the client computer looks up the file server IP address for the file system identifier in the configuration database, and then the client computer includes this file handle in a metadata request to the file server IP address for an extent map of data blocks for the file. Upon receipt of the extent map, the client computer uses the extent map to compute logical block addresses inserted into the logical block address fields of SCSI read or write commands for reading from or writing to the file data in a storage array in the storage area network.

In step 166, upon receiving a "no access" reply from a file server in response to a metadata request for an "extent map," the client computer attempts to get a more current file handle from the global namespace server by re-sending the metadata request including the original file handle to the data file in the virtual file system. This original file handle is the file handle of the stub file corresponding to the data file. This original file handle was returned by the global namespace server to the client computer in step 161 of FIG. 10.

In step 167 of FIG. 11, upon receiving a "no access" reply from the global namespace server in response to a request for an "extent map," the client computer reads data from or writes data to the file by including the original file handle in a NFS or CIFS read or write request to the global namespace server.

FIGS. 12 to 15 show a specific example of programming of the FMP client in a client computer, such as the FMP client 51 in the client computer 22 of FIG. 1. As introduced above, the FMP client is invoked to read data from or write data to a file specified by a virtual file handle from the global namespace server.

Figure 12:
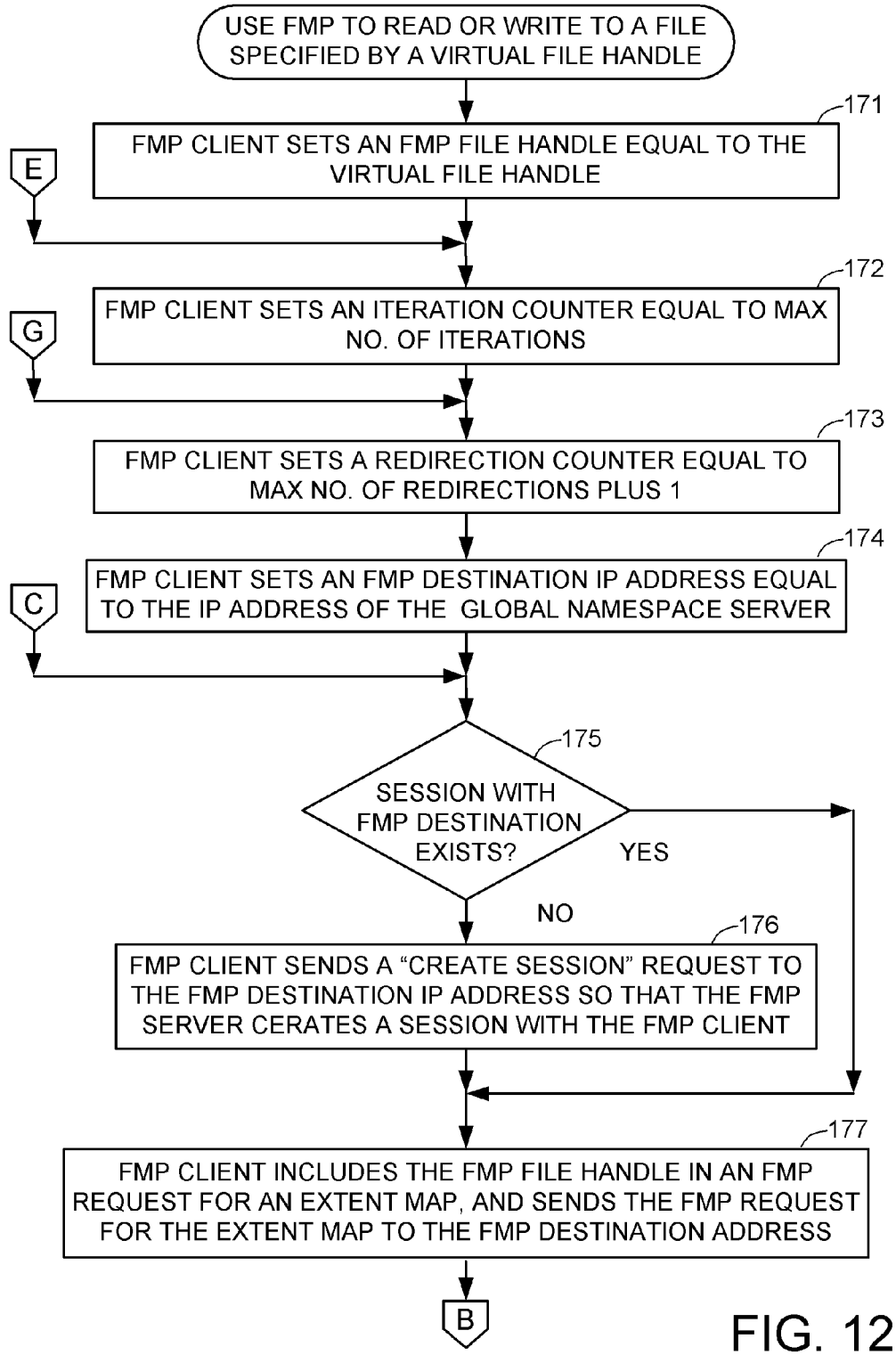
FIGS. 12, 13, 14, and 15 together comprise a flowchart of programming of a file mapping protocol (FMP) client in the data processing system of FIG. 1.

In a first step 171 of FIG. 12, the FMP client sets an FMP handle equal to the virtual file handle. In step 172, the FMP client sets an iteration counter to a maximum number of iterations. For example, the maximum number of iterations is two. In step 173, the FMP client sets a redirection counter to a maximum number of redirections plus 1. For example, the maximum number of redirections is two. In step 174, the FMP client sets an FMP destination IP address to the IP address of the global namespace server.

In a preferred implementation, the FMP client creates a session with an FMP server before the FMP client sends a metadata request to the FMP server for an "extent map." When a session has been created between the FMP client and the FMP server, the FMP server assigns a "session ID" to the FMP client, records the session ID in a connection database in association with the IP source address, and returns this session ID to the FMP client for inclusion in subsequent FMP requests. The FMP server will terminate the session if a subsequent request from the FMP client is not received within a certain session lifetime. The FMP client may send a "heartbeat" request to the FMP server in order to reset an expiration timer for the session, and the FMP client may send a "session terminate" request to the FMP server in order to explicitly terminate the session before the end of its lifetime.

In step 175, the FMP client checks whether a session with the FMP destination presently exists. If the FMP client does not already have a session with the FMP destination, then execution continues to step 176. In step 176, the FMP client sends a "create session" request to the FMP destination so that the FMP server at the FMP destination creates a session with the FMP client. Once the FMP server returns a "session ID" to the FMP client, execution continues to step 177. Execution also branches to step 177 from step 175 if the FMP client already has a session with the FMP server.

In step 177, the FMP client includes the FMP file handle in an FMP request for an extent map, and sends the FMP request for the extent map to the FMP destination IP address. Execution continues from step 177 to step 178 of FIG. 13.

Figure 13:
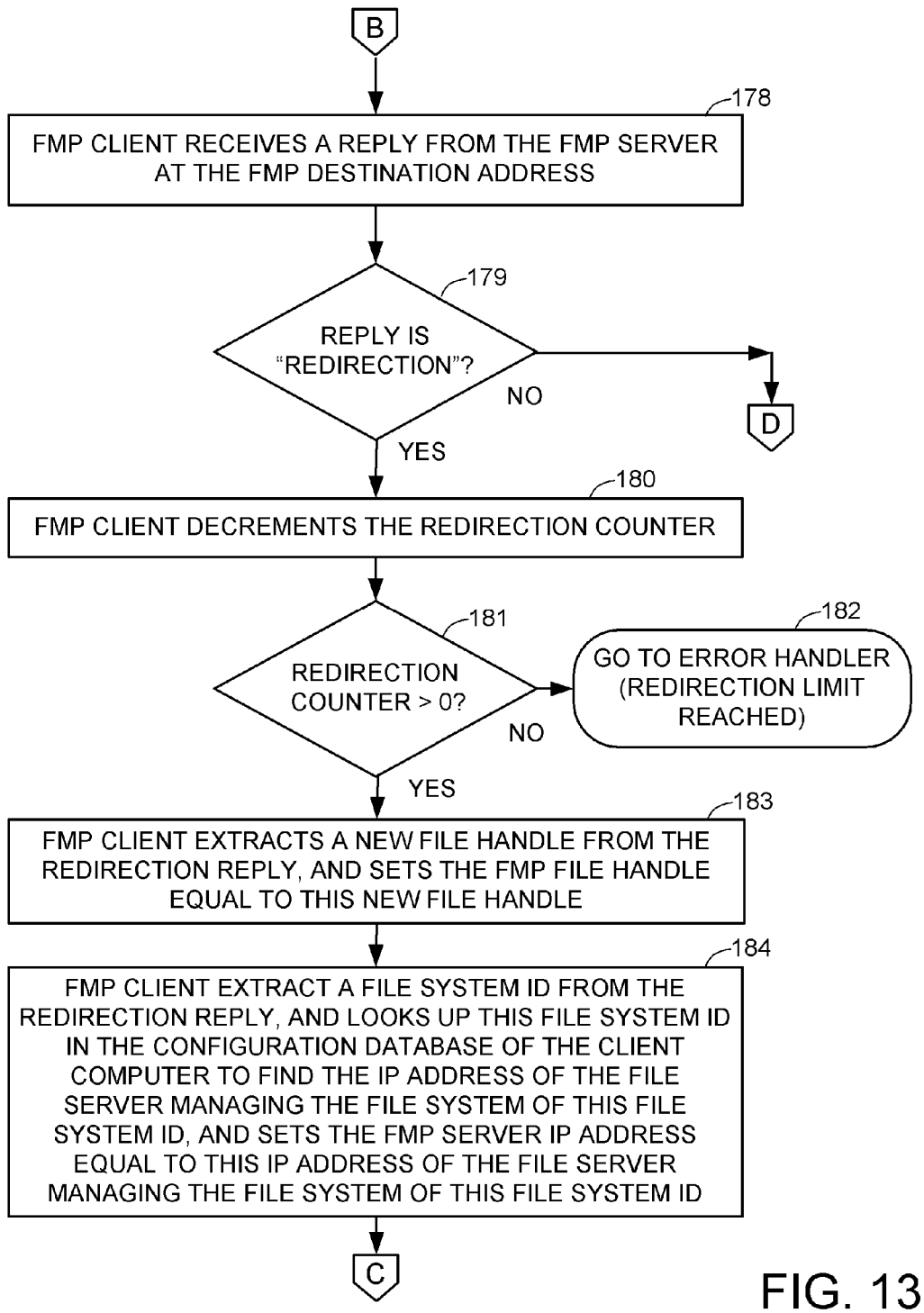

In step 178 of FIG. 13, the FMP client receives a reply from the FMP serer at the FMP destination address. In step 179, if the reply is a redirection reply, then execution continues to step 180. In step 180, the FMP client decrements the redirection counter. In step 181, if the redirection counter is not greater than zero, then execution branches to an error handler in step 182 to report that the redirection limit has been reached. If the redirection counter is greater than zero, then execution continues from step 181 to step 183.

In step 183, the FMP client extracts a new file handle from the redirection reply, and sets the FMP file handle to this new file handle. In step 184, the FMP client extracts a file system ID from the redirection reply, and looks up this file system ID in the configuration database of the client computer. Execution loops back from step 184 to step 175 in FIG. 12. In the typical case, execution will then branch from step 175 to step 177, and in step 177, the FMP client will send an FMP request for an extent map to one of the file servers in FIG. 1.

Figure 14:
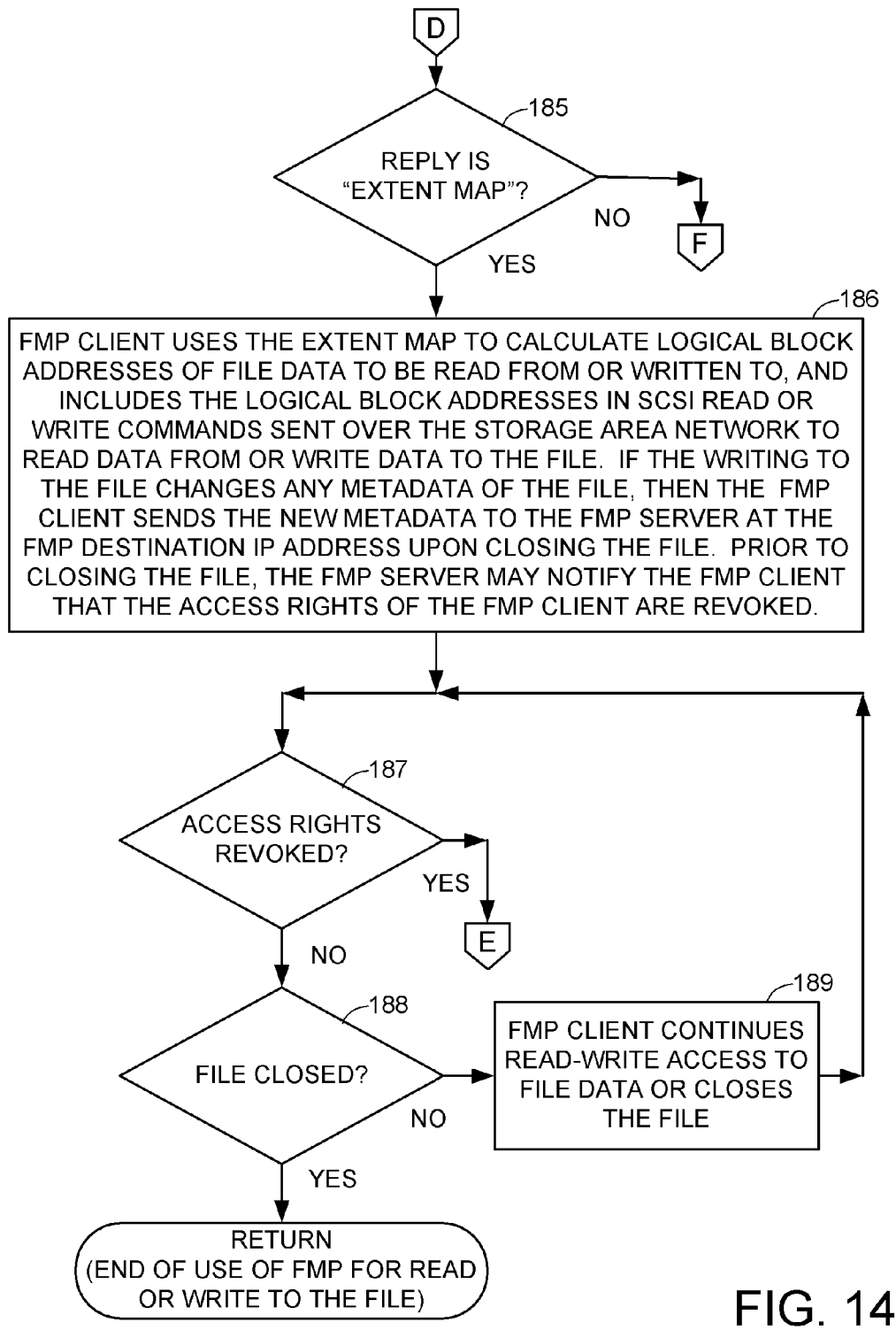

In step 179 in FIG. 13, if the reply (received in step 178 of FIG. 13) is not a redirection reply, then execution branches from step 179 to step 185 of FIG. 14. If the reply is an "extent map," then execution continues from step 185 to step 186. The return of an extent map indicates to the FMP client that the file has been opened for the FMP client so that the FMP client has access rights to read data from or write data to the extents in the extent map.

In step 186, the FMP client uses the extent map to calculate logical block addresses of file data to be read from or written to, and includes the logical block addresses in SCSI read or write commands sent over the storage area network to read data from or write data to the file. If the writing to the file changes any metadata of the file, then the FMP client sends the new metadata to the FMP server at the FMP destination IP address upon closing the file. Prior to closing the file, the FMP server may notify the FMP client that the access rights of the FMP client have been revoked.

In step 187, if the FMP client's access rights have not been revoked, then execution continues to step 188. In step 188, if the FMP client has closed the file, then execution returns because use of the FMP client for read or write to the file is finished. In step 188, if the file is not closed, then execution branches to step 189. In step 189, the FMP client continues read-write access to the file data or closes the file. In step 187, if the FMP client's access rights have been revoked, then execution loops back to step 172 of FIG. 12 so that the FMP client attempts to re-acquire access rights to the file from the global namespace server.

In step 179 in FIG. 13, if the reply (received in step 178 of FIG. 13) is not a redirection reply, then execution branches from step 179 to step 185 of FIG. 14. If the reply is an "extent map," then execution continues from step 185 to step 186.

Figure 15:
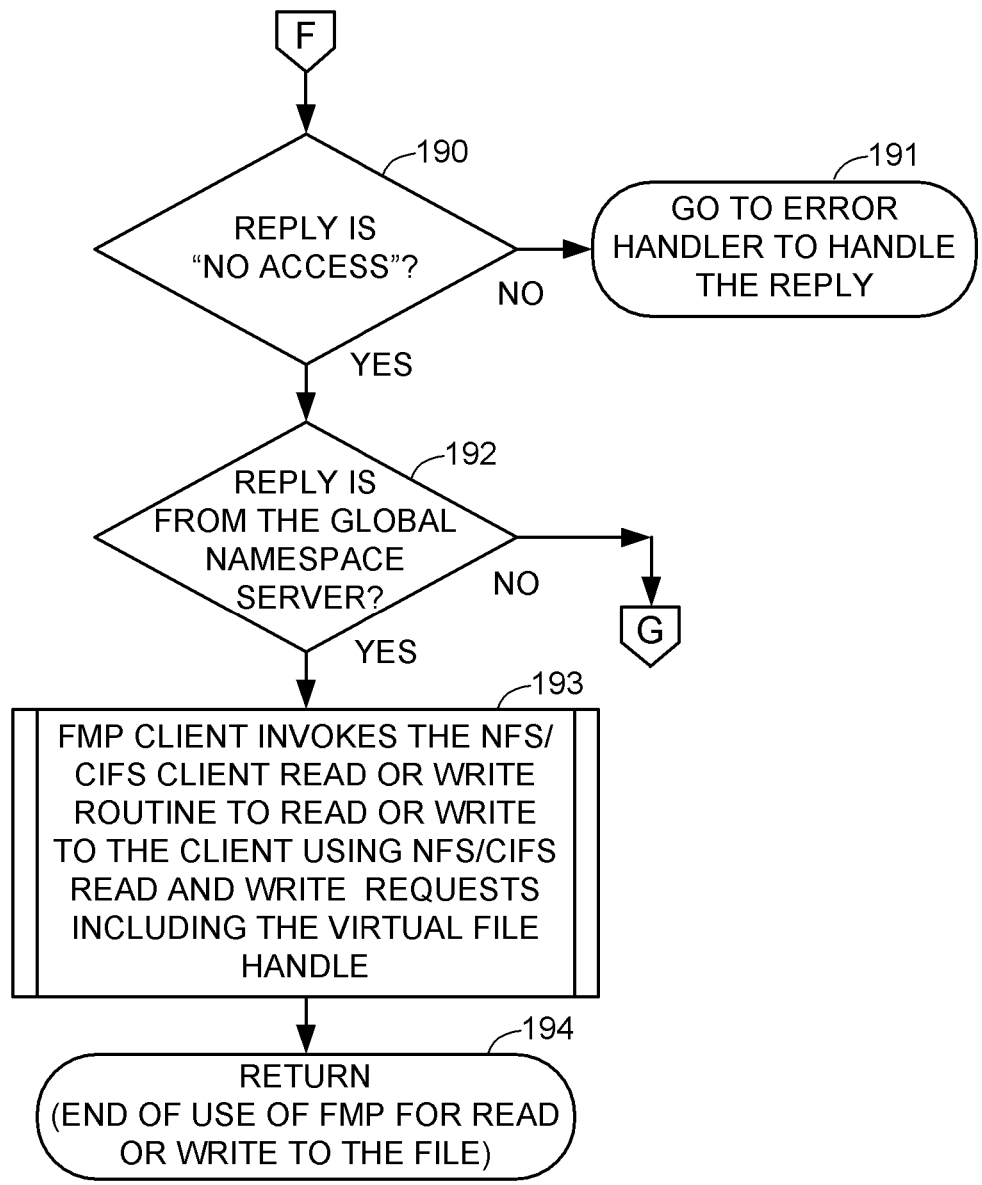

In step 185 of FIG. 14, if the reply (received in step 178 of FIG. 13) is not an extent map, then execution branches to step 190 of FIG. 15. In this case, the reply typically is "no access." If the reply is something other than "no access," then in step 190 execution branches to an error handler to handle the reply in step 191. If the reply is "no access," then execution continues from step 190 to step 192.

In step 192, if the reply is not from the global namespace server, then execution loops back to step 173 to re-attempt acquisition of access to the file from the global namespace server. Otherwise, if the reply is from the global namespace server, then execution continues from step 192 to step 193. In this case, it is likely that FMP access to the file is being denied because the file is currently being migrated by the migration engine of the global namespace server.

In step 193, the FMP client invokes the read or write routines of the NFS/CIFS client in the client computer so that the NFS/CIFS client sends NFS or CIFS read or write requests including the virtual file handle to the global namespace server. Therefore, if FMP access to the file was denied because the file is currently being migrated by the migration engine of the global namespace server, then the global namespace server will temporarily interrupt the migration to perform the read or write operations of the NFS or CIFS read or write requests. When reading or writing to the file is finished, use of the FMP client for reading from or writing to the file is finished, and execution returns in step 194.

Figure 16:
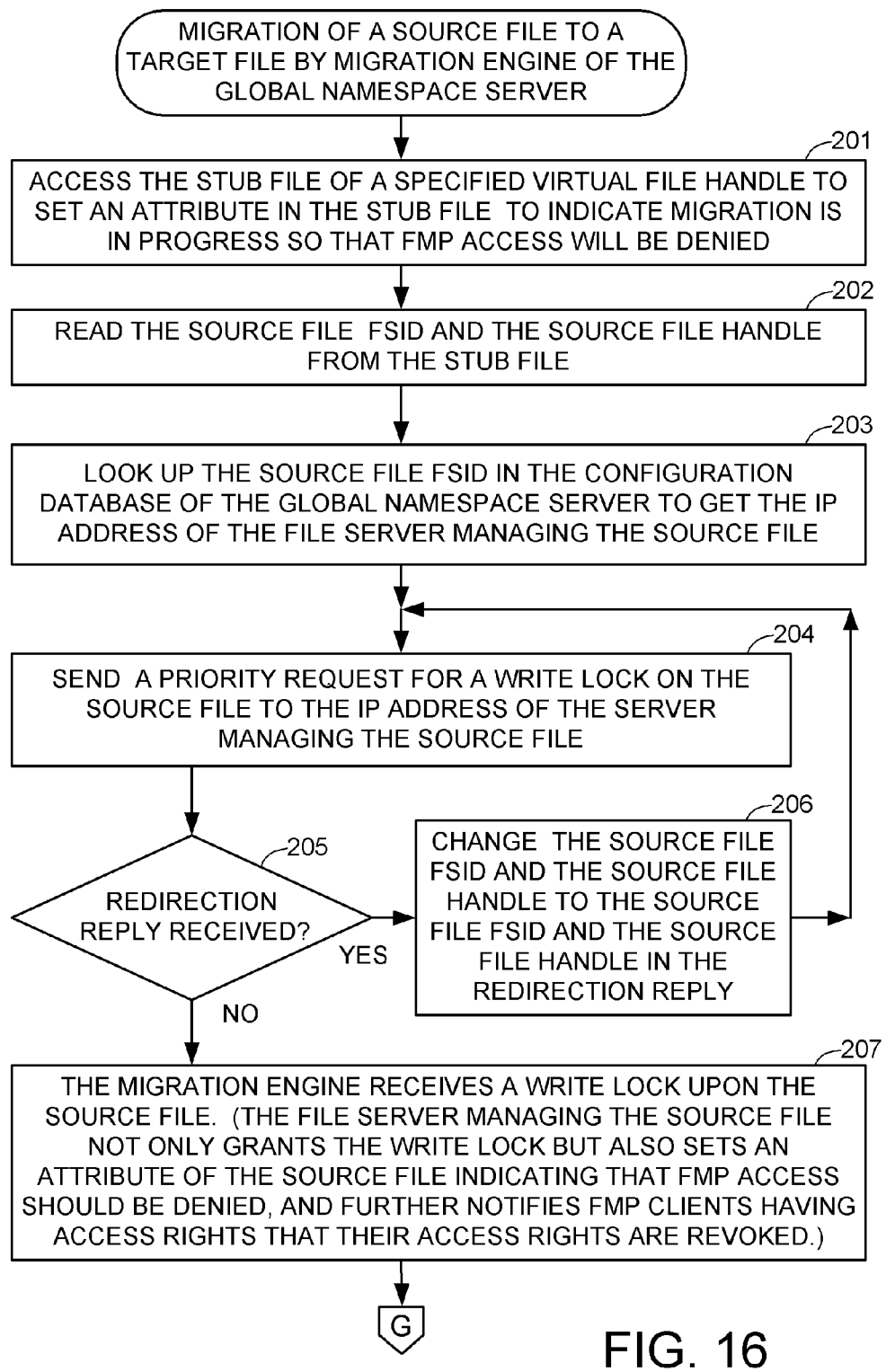
FIGS. 16, 17, and 18 together comprise a flowchart of programming of a migration engine in the data processing system of FIG. 1.

FIG. 16 shows a migration routine in the migration engine (39 in FIG. 1) of the global namespace server (27 in FIG. 1). The migration routine is invoked to migrate a file specified by a virtual file handle to a target specified by a target file system ID. In a first step 201, the migration engine sets the migration flag attribute (e.g. 112 in FIG. 7) in the stub file specified by the virtual file handle to indicate that migration is in progress so that access to the metadata of the file by an FMP client will be denied. In step 202, the migration engine reads the source file system ID and the source file handle from the stub file specified by the virtual file handle. In step 203, the migration engine looks up the file system ID of the source file in the configuration database of the global namespace server to get the IP address of the file server managing the source file.

In step 204, the migration engine sends a priority request for a write lock on the source file to the IP address of the file server managing the source file. In step 205, if the migration engine receives a redirection reply from the IP address to which the request for a write lock was sent, then execution branches to step 206. In step 206, the migration engine changes the file system ID of the source file to the file system ID in the redirection reply, and the migration engine changes the source file handle to the file handle in the redirection reply. Execution loops back to step 204.

In step 205, if a redirection reply is not received from the IP address to which the request for a write lock was sent, then execution continues to step 207. In this case, in step 207, the migration engine receives a write lock upon the source file. The file server managing the source file not only grants the write lock to the migration engine but also sets a migration flag attribute (e.g., 113 in FIG. 7) of the source file indicating that FMP access should be denied, and further notifies any FMP clients having access rights to the source file that their access rights are revoked. Execution continues from step 207 in FIG. 12 to step 208 in FIG. 17.

Figure 17:
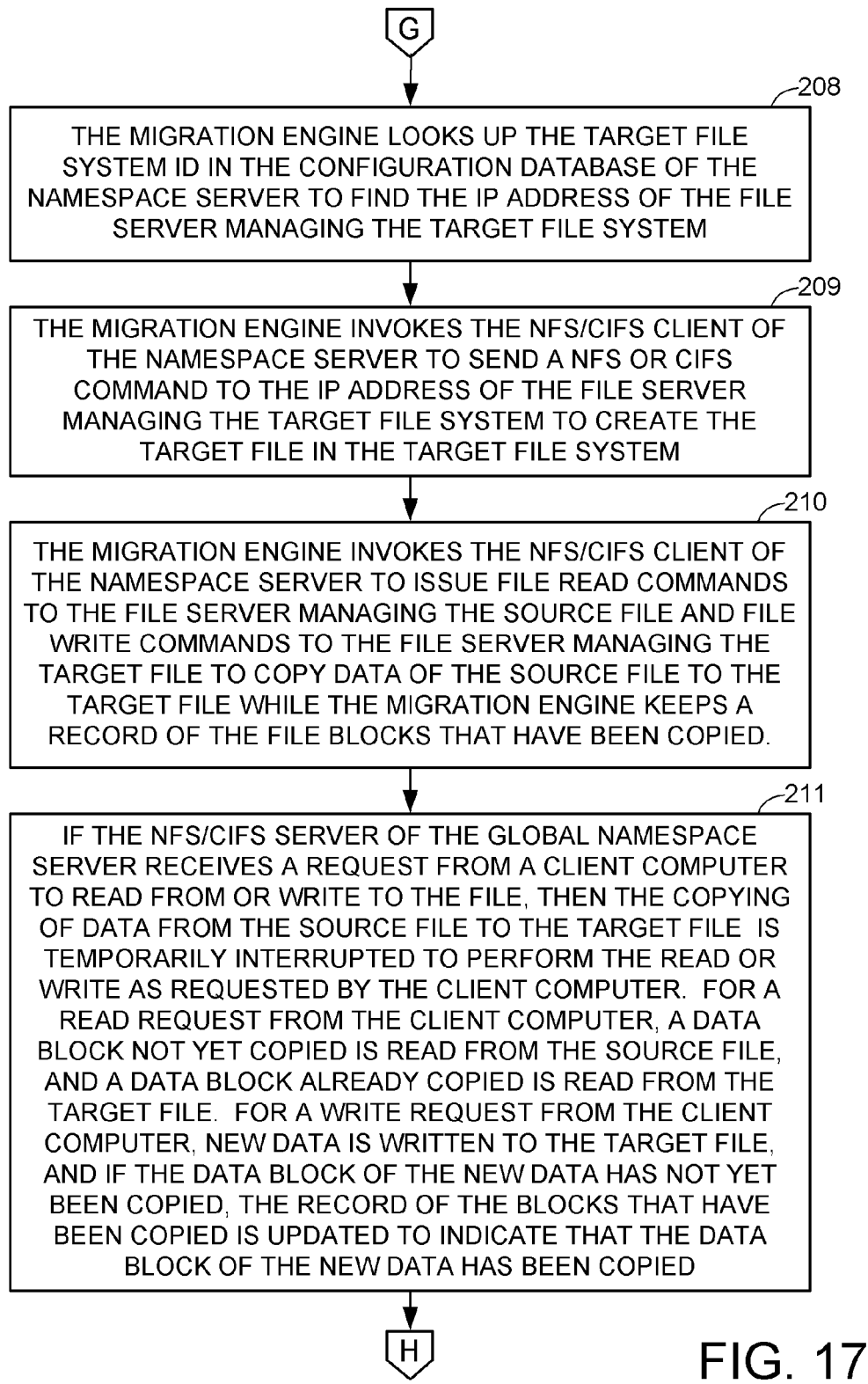

In step 208 of FIG. 17, the migration engine looks up the target file system ID in the configuration database of the global namespace server to find the IP address of the file server managing the target file system. In step 209, the migration engine invokes the NFS/CIFS client of the global namespace server to send a NFS or CIFS command to the IP address of the file server managing the target file system to create the target file in the target file system. In step 210, the migration engine invokes the NFS/CIFS client of the global namespace server to issue NFS or CIFS file read commands to the file server managing the source file and NFS or CIFS file write commands to the file server managing the target file to copy data of the source file to the target file while the migration engine keeps a record of the file blocks that have been copied.

Figure 18:
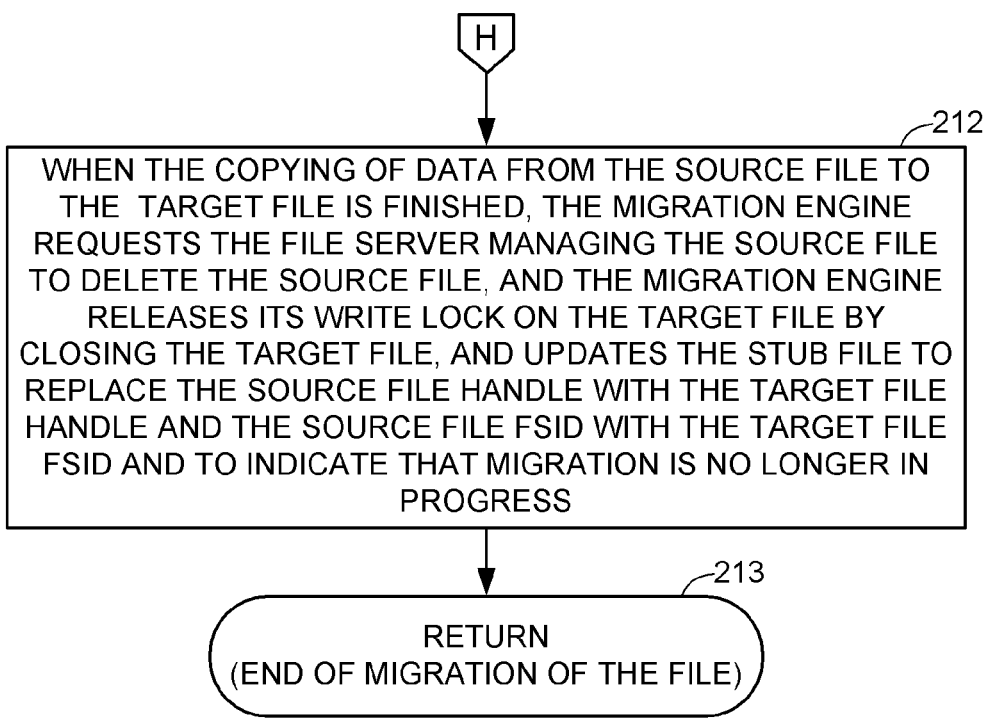

In step 211, if the NFS/CIFS server of the global namespace server receives a request from a client computer to read from or write to the file, then the copying of data from the source file to the target file is temporarily interrupted to perform the read or write as requested by the client computer. For a read request from the client computer, a data block not yet copied is read from the source file, and a data block already copied is read from the target file. For a write request, new data is written to the target file, and if the data block of the new data has not yet been copied, the record of the file blocks that have been copied is updated to indicate that the data block of the new data has been copied. Execution continues from step 211 to step 212 in FIG. 18.

In step 212 in FIG. 14, when the copying of data from the source file to the target file is finished, the migration engine requests the file server managing the source file to delete the source file, and the migration engine releases its write lock on the target file by closing the target file, and updates the stub file to replace the source file handle with the target file handle and to replace the source file system ID with the target file system ID and to clear the migration flag attribute of the stub file to indicate that migration is no longer in progress.

The migration engine may also migrate a group of files or an entire file system. This could be done by invoking the routine of 16 to 18 sequentially so that it is invoked once for each of the files in the group or in the file system. For ease of recovery in case of a file server crash during the migration of a group of files or during migration of an entire file system, however, it is often desirable to put the entire group of files or the entire file system into a consistent state before copying of the files from the source file server to the target file server. In this case, steps 201 to 203 of FIG. 16 would be performed upon all of the files in the group or upon all of the files in the file system, and then steps 204 to 207 of FIG. 16 would be performed upon all of the files in the group or upon all of the files in the file system. At this point, the group of files or the file system to be migrated would become "frozen" in a consistent state, and a snapshot copy of this consistent state could be taken for recovery purposes in case of a crash of the source file server or the target file server during the migration. Once a snapshot copy of this consistent state is taken, the files in the group or in the file system would be copied sequentially by performing steps 208 to 211 of FIG. 17 for each of the files in the group or in the file system, and once all of these files have been copied from the source file server to the target file server, then step 212 would be performed for each of the files in the group or in the file system.

In view of the above, there has been described a data processing system including client computers, file servers, and a namespace server linked in a data network for file access using the NFS or CIFS protocol. The namespace server provides the clients with NFS or CIFS access to a virtual file system including files stored in the file servers, and translates NFS or CIFS file read or write requests and forwards the translated requests to the file servers in a fashion transparent to the client. The namespace server also provides migration of files between the file servers in a fashion transparent to the NFS or CIFS access to the virtual file system. The client computers and storage arrays storing the file data are also linked in a storage area network for high speed block access to the file data using a file mapping protocol. The namespace server is coordinated with the high-speed client access to the storage arrays by the namespace server redirecting a metadata access request in accordance with the file mapping protocol to the appropriate file server when the file is not being migrated, and otherwise denying a metadata access in accordance with the file mapping protocol when the file is being migrated so that the client reverts to NFS or CIFS access.

What is claimed is:

1. In a data processing system including client computers, file servers managing respective file systems, storage arrays storing file data of the file systems, and a namespace server providing the client computers with file access to a virtual file system in accordance with the Network File System (NFS) protocol or the Common Internet File System (CIFS) protocol, the virtual file system containing files of the respective file systems managed by the file servers, a method of providing at least one of the client computers with read or write access to a specified file in the virtual file system, said method comprising:

said at least one of the client computers sending to the namespace server a first metadata access request in accordance with a file mapping protocol for metadata access to the specified file, and the namespace server responding to the first metadata request by determining that the specified file is not presently being migrated, and upon determining that the specified file is not presently being migrated, the namespace server returning to said at least one of the client computers a redirection reply redirecting said at least one of the client computers to one of the file servers managing a respective one of the file systems including the specified file, and said at least one of the client computers receiving the redirection reply and using the redirection reply to obtain file mapping metadata from said one of the file servers managing the respective one of the file systems including the specified file, and using the file mapping metadata to produce a block access request sent to one of the storage arrays storing file data of the specified file to read data from or write data to the specified file; and said at least one of the client computers sending a second metadata access request in accordance with the file mapping protocol to the namespace server for metadata access to the specified file, and the namespace server responding to the second metadata request by determining that the specified file is now being migrated, and upon determining that the specified file is now being migrated, the namespace server returning to said at least one of the client computers a metadata access denied reply, and said at least one of the client computers receiving the metadata access denied reply and responding to the metadata access denied reply by sending to the namespace server a read or write request in accordance with the Network File System (NFS) protocol or the Common Internet File System (CIFS) protocol to read data from or write data to the specified file as requested by said at least one client computer.

2. The method as claimed in claim 1, wherein said at least one client computer uses the file mapping metadata to produce the block access request sent to one of the storage arrays storing file data of the specified file to write data to the specified file.

3. The method as claimed in claim 1, wherein said at least one client computer responds to the metadata access denied reply by sending to the namespace server a write request in accordance with the Network File System (NFS) protocol or the Common Internet File System (CIFS) protocol to write data to the specified file while the specified file is being migrated.

4. The method as claimed in claim 1, wherein the file mapping metadata includes a list of extents of file data of the specified file, and wherein the block address request sent to said one of the storage arrays storing data of the specified file is a Small Computer System Interface (SCSI) read or write command.

5. The method as claimed in claim 1, wherein the data processing system further includes a storage area network (SAN) linking the client computers to the storage arrays for block access to the file data of the file systems, and the method further includes said at least one of the client computers sending the block access request over the storage area network (SAN) to said one of the storage arrays storing the file data of the specified file to read data from or write data to the specified file, and the block access request sent over the storage area network (SAN) to said one of the storage arrays storing the file data of the specified file to read data from or write data to the specified file is a Small Computer System Interface (SCSI) read or write command.

6. The method as claimed in claim 1, wherein the data processing system further includes an Internet Protocol (IP) network linking the client computers to the namespace server, and wherein the method further includes said at least one of the client computers sending the first metadata request over the Internet Protocol (IP) network to the namespace server, and the namespace server returning the redirection reply to said at least one of the client computers over the Internet Protocol (IP) network, and said at least one of the client computers sending the second metadata access request to the namespace server over the Internet Protocol (IP) network, and the namespace server returning to said at least one of the client computers the metadata access denied reply over the Internet Protocol (IP) network, and said at least one of the client computers sending to the namespace server the read or write request in accordance with the Network File System (NFS) protocol or the Common Internet File System (CIFS) protocol over the Internet Protocol (IP) network to read data from or write data to the specified file while the specified file is being migrated.

7. The method as claimed in claim 1, which further includes the namespace server migrating the specified file between the file servers by sending to the file servers read or write commands in accordance with the Network File System (NFS) protocol or the Common Internet File System (CIFS) protocol to copy the specified file between the file servers, and the namespace server interrupting the copying of the specified file between the file servers so that the migration of the specified file is transparent to read or write access of the specified file in accordance with the Network File System (NFS) protocol or the Common Internet File System (CIFS) protocol by said at least one of the client computers, and the namespace server renewing the copying of the specified file between the file servers once the read or write access of the specified file in accordance with the Network File System (NFS) protocol or the Common Internet File System (CIFS) protocol by said at least one of the client computers has been completed.

8. The method as claimed in claim 1, which further includes the namespace server migrating the specified file from a first one of the file servers to a second one of the file servers by setting an attribute of the specified file in the virtual file system to indicate that migration of the specified file is in progress, notifying the first one of the file servers that migration of the specified file is in progress, and copying the specified file from the first one of the file servers to the second one of the file servers, and the first one of the file servers responding to the notification that migration of the specified file is in progress by denying metadata access of the client computers to the specified file.

9. The method as claimed in claim 8, which further includes said at least one of the client computers responding to denial of metadata access to the specified file by the first one of the file servers by said at least one of the client computers sending the second metadata access request to the namespace server in accordance with the file mapping protocol for metadata access to the specified file.

\* \* \* \* \*